(12) United States Patent
Fukuhara et al.

(10) Patent No.: US 7,327,436 B2
(45) Date of Patent: Feb. 5, 2008

(54) METHOD FOR EVALUATING A LOCAL FLARE, CORRECTION METHOD FOR A MASK PATTERN, MANUFACTURING METHOD FOR A SEMICONDUCTOR DEVICE AND A COMPUTER PROGRAM PRODUCT

(75) Inventors: Kazuya Fukuhara, Tokyo (JP); Satoshi Tanaka, Kawasaki (JP); Kenji Chiba, Tokyo (JP); Kei Hayasaki, Kamakura (JP); Kenji Kawano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 90 days.

(21) Appl. No.: 11/136,404

(22) Filed: May 25, 2005

(65) Prior Publication Data

US 2005/0275820 A1 Dec. 15, 2005

(30) Foreign Application Priority Data

May 25, 2004 (JP) ............................ P2004-154878

(51) Int. Cl.
*G03B 27/68* (2006.01)
*G03B 27/72* (2006.01)

(52) U.S. Cl. .......................................... 355/52; 355/69

(58) Field of Classification Search .................... 430/5, 430/20, 30, 31; 355/52, 55, 69
See application file for complete search history.

(56) References Cited

U.S. PATENT DOCUMENTS

| | | | |
|---|---|---|---|
| 5,717,483 A * | 2/1998 | Kikuchi | 355/69 |
| 6,835,507 B2 * | 12/2004 | Ki et al. | 430/5 |
| 6,862,726 B2 * | 3/2005 | Futatsuya et al. | 716/19 |
| 6,986,973 B2 * | 1/2006 | Yao et al. | 430/5 |
| 2003/0068565 A1 | 4/2003 | Ki et al. | |
| 2004/0023130 A1 | 2/2004 | Yao et al. | |
| 2004/0096772 A1 * | 5/2004 | Nakamura et al. | 430/270.1 |
| 2004/0196447 A1 * | 10/2004 | Watanabe | 355/77 |
| 2005/0170264 A1 | 8/2005 | Hukuhara | |

FOREIGN PATENT DOCUMENTS

JP 2003-100624 4/2003

OTHER PUBLICATIONS

Hiroki Futatsuya et al., "Model-based OPC/DRC considering local flare effect", Optical Microlithography XVII, edited by B.W. Smith, Proceedings of SPIE, vol. 5377, pp. 451-458, (Feb. 24-27, 2004).

* cited by examiner

*Primary Examiner*—Diane I. Lee
*Assistant Examiner*—Chia-how Michael Liu
(74) *Attorney, Agent, or Firm*—Finnegan, Henderson, Farabow, Garrett & Dunner, L.L.P.

(57) ABSTRACT

A method for evaluating a local flare in an exposure tool, includes: measuring a projection light intensity distribution by transferring a monitor mask pattern onto a semiconductor substrate; calculating a first ratio between an illumination light intensity on the monitor mask pattern and a first projection light intensity calculated based on the monitor mask pattern; calculating a distribution function of a local flare, due to a mask pattern coverage of the monitor mask pattern, based on the first ratio and the projection light intensity distribution; dividing a design mask pattern into a plurality of unit areas; calculating a second ratio between the illumination light intensity on each of the unit areas and a second projection light intensity calculated based on the design mask pattern; and calculating a local flare intensity in each of the unit areas, based on the second ratio and the distribution function.

20 Claims, 21 Drawing Sheets

METHOD FOR EVALUATING A LOCAL FLARE, CORRECTION METHOD FOR A MASK PATTERN, MANUFACTURING METHOD FOR A SEMICONDUCTOR DEVICE AND A COMPUTER PROGRAM PRODUCT

CROSS REFERENCE TO RELATED APPLICATIONS AND INCORPORATION BY REFERENCE

This application is based upon and claims the benefit of priority from prior Japanese patent application P2004-154878 filed on May 25, 2004; the entire contents of which are incorporated by reference herein.

BACKGROUND OF THE INVENTION

1. Field of the Invention

The present invention relates to formation of a fine pattern of a semiconductor device. Specifically, with regard to a dimensional variation of a resist pattern in a photolithography process, the present invention relates to an evaluation method of dependence on a mask pattern coverage, a correction method for a mask pattern to prevent dependence on a mask pattern coverage, a manufacturing method for a semiconductor device, and a computer program product for evaluating dependence on a mask pattern coverage.

2. Description of the Related Art

In the continuing progress of miniaturization of a semiconductor device, a technique for precisely controlling a line width of a pattern formed on a semiconductor substrate by photolithography is required. In a one-shot exposure area, dimensions of a resist pattern provided by transferring a mask pattern of a photomask may vary in some cases. A dimensional variation in a resist pattern leads to a dimensional variation in a circuit pattern of a semiconductor device, to negatively affect operations of the semiconductor device. Therefore, the dimensional variations in the resist pattern needs to be reduced as much as possible.

One of the causes of variation in a dimension of a resist pattern transferred by a mask pattern uniformly provided on a photomask is an optical proximity effect (OPE) which occurs in an exposure process. The OPE conspicuously appears in a pattern in a dimension proximate to a resolution limit of an exposure tool. The OPE can be prevented by optical proximity correction (OPC) which corrects dimensions of a mask pattern by predicting a dimensional variation from the photolithography simulation in view of a pattern arrangement in a proximity area within several μm of a target pattern.

In addition, besides the OPE which occurs in the exposure process, a process proximity effect (PPE) which occurs in a post-exposure baking (PEB) process and a development process, also vary dimensions of a resist pattern. With regard to the PPE, the dimensional variation in the resist pattern can be prevented by modifying each process based on a relationship between dimensional variation of a target pattern and a condition of a pattern surrounding the target pattern, which is experimentally provided by process simulations, or by correcting the dimension of the mask pattern.

Influence of a coverage condition of the mask pattern of the photomask in a relatively wide range surrounding the resist pattern has been a problem with the dimensional variation in a fine resist pattern. The "relatively wide" range refers to a range within about 100 μm to about 1000 μm of the target pattern. The relatively wide range is far wider than the proximity area on which the OPE and the PPE have influence.

For example, in the case of mask patterns of a random access memory (RAM) and a read-only memory (ROM), a peripheral circuit is provided for controlling a memory cell array and a memory cell. Fine patterns, for example, line and space (L/S) patterns with a width ratio of a line to a space of about 1:1, are densely arranged in the memory cell array area where a mask pattern coverage is large. The memory cell array area has a rectangular shape of about 5 mm on a side, for example. In the peripheral circuit area, opaque patterns of the photomask are less than the memory cell array area. Thus, the peripheral circuit area has a smaller local mask pattern coverage of the photomask.

A mask pattern including the memory cell and the peripheral circuit is transferred onto a resist film to measure line widths of the L/S pattern along a diagonal line of the rectangular shaped memory cell array area. With regard to a line width of an L/S resist pattern transferred onto the resist film, the line width may be thinner in an end portion of the memory cell array area than the center portion of the memory cell array area, regardless of the constant line width of the L/S pattern on the photomask. A boundary in which a dimension in the resist pattern may vary in reference to the center portion of the memory cell array is located about 100 μm to about 1000 μm away from the end portion of the memory cell array area, although depending on an exposure tool. The dimensional variation in the resist pattern depending on the local mask pattern coverage of the photomask has been an increasingly large problem, particularly as the circuit pattern to be formed becomes finer.

Reasons for the dependence of the dimensional variation in the resist pattern on the mask pattern coverage include a local flare (also refered to as a "mid range flare") which occurs in an optical system of the exposure tool, transpiration and re-deposition of an acid which occurs from the resist film in the post-exposure baking (PEB) process, as well as a development microloading effect of a resist image. The "flare" refers to a noise in a projection light, which does not contribute to image formation to deteriorate contrast of an aerial image. The "local flare" refers to a flare which is distributed depending on a shape of a mask pattern, particularly on a local mask pattern coverage of a photomask. Generally, the local flare is smaller in the vicinity of an area having a larger mask pattern coverage, whereas the local flare is larger in the vicinity of an area having a smaller mask pattern coverage. In addition, the "development microloading effect" refers to a phenomenon in which development rates vary depending on a pattern density.

A method for correcting of a line width of a mask pattern having a plurality of transparent areas and opaque areas has been proposed based on an amount of local flare of a lens of an exposure tool, and a ratio of sums of the transparent areas and the opaque areas in the photomask (see Japanese Patent Laid-open Official Gazette No. 2003-100624). The amount of the local flare of the lens is quantified by comparing line widths of resist patterns transferred from the photomask. However, in the case of the method as disclosed in the patent literature, periods of the transparent areas and the opaque areas are not taken into consideration. A large error can occur in a line width thus corrected when the periods of the transparent areas and the opaque areas is approximately equal to a wavelength of exposure light in terms of a pattern dimension transferred on the semiconductor substrate.

Dimensional variations in resist patterns caused by a resist material and a development process are evaluated, for example, by use of a plurality of photomasks, each of which has a different mask pattern coverage with regard to a peripheral area of a mask pattern, such as a L/S pattern. However, a dimension error distribution in a mask pattern may occur due to dependence on a mask pattern coverage inherent in an electron beam lithography system and the like to be used to fabricate the photomask. For this reason, a dimension error distribution in a mask pattern of an inspection photomask is measured prior to correcting a measured dimension value of a transferred resist pattern. The dimension error in the mask pattern is required to be corrected for each of the photomasks having the diffrent mask pattern coverages. Therefore, the evaluation of the dimensional variations in the resist pattern may be complicated, and may require a longer time.

SUMMARY OF THE INVENTION

A first aspect of the present invention inheres in a method for evaluating a local flare in an exposure tool, including measuring a projection light intensity distribution on a semiconductor substrate by transferring a monitor mask pattern of an inspection photomask onto the semiconductor substrate, the monitor mask pattern being a window pattern surrounded by an opaque film; calculating a first ratio between an illumination light intensity at the monitor mask pattern and a first projection light intensity on the semiconductor substrate, the first projection light intensity calculated based on the monitor mask pattern; calculating a distribution function of a local flare, due to a mask pattern coverage of the monitor mask pattern, based on the first ratio and the projection light intensity distribution; dividing a design mask pattern of a target photomask into a plurality of unit areas; calculating a second ratio between the illumination light intensity on each of the unit areas and a second projection light intensity on the semiconductor substrate, the second projection light intensity calculated based on the design mask pattern; and calculating a local flare intensity in each of the unit areas, based on the second ratio and the distribution function.

A second aspect of the present invention inheres in a method for evaluating a local flare in an exposure tool, including projecting a first periodic mask pattern formed in an opaque film of an inspection photomask, onto a resist film on a semiconductor substrate; projecting a second mask pattern including an opaque portion formed in the opaque film and an opening portion surrounding the opaque portion onto the resist film, so as to overlay the opaque portion onto a region of the resist film where the first mask pattern is projected; forming a plurality of resist images corresponding to the periodic pattern; measuring a line width distribution of the resist images in a repeating direction of the resist images; and measuring a line width variation in an end portion of the resist images from an average value of the line widths in a center portion of the resist images, and a variation distance from the end portion to a position of the line width distribution reaching a variation tolerance of the line widths.

A third aspect of the present invention inheres in a correction method for a mask pattern, including measuring a projection light intensity distribution of an exposure tool on a semiconductor substrate by transferring a monitor mask pattern of an inspection photomask onto the semiconductor substrate, the monitor mask pattern being a window pattern surrounded by an opaque film; calculating a first ratio between an illumination light intensity at the monitor mask pattern and a first projection light intensity on the semiconductor substrate, the first projection light intensity calculated based on the monitor mask pattern; calculating a distribution function of a local flare, due to a mask pattern coverage of the monitor mask pattern, based on the first ratio and the projection light intensity distribution; dividing a design mask pattern of a target photomask into a plurality of unit areas; calculating a second ratio between the illumination light intensity on each of the unit areas and a second projection light intensity on the semiconductor substrate, the second projection light intensity calculated based on the design mask pattern; calculating a local flare intensity in each of the unit areas based on the second ratio and the distribution function; and calculating a dimensional variation in a transferred resist pattern of the design mask pattern, based on a distribution of the local flare intensity on a surface of the semiconductor substrate.

A fourth aspect of the present invention inheres in a manufacturing method for a semiconductor device, including measuring a projection light intensity distribution of an exposure tool on a semiconductor substrate by transferring a monitor mask pattern of an inspection photomask onto the semiconductor substrate, the monitor mask pattern being a window pattern surrounded by an opaque film; calculating a first ratio between an illumination light intensity at the monitor mask pattern and a first projection light intensity on the semiconductor substrate, the first projection light intensity calculated based on the monitor mask pattern; calculating a distribution function of a local flare, due to a mask pattern coverage of the monitor mask pattern, based on the first ratio and the projection light intensity distribution; dividing a design mask pattern of a target photomask into a plurality of unit areas; calculating a second ratio between the illumination light intensity on each of the unit areas and a second projection light intensity on the semiconductor substrate, the second projection light intensity calculated based on the design mask pattern; calculating a local flare intensity in each of the unit areas, based on the second ratio and the distribution function; calculating a dimensional variation in a transferred resist pattern of the design mask pattern, based on a distribution of the local flare intensity on a surface of the semiconductor substrate; fabricating the target photomask using corrected mask pattern provided by correcting the design mask pattern based on the dimensional variation; loading a semiconductor substrate coated with a resist film to the exposure tool; projecting the target photomask onto the semiconductor substrate, so as to transfer the corrected mask pattern on the resist film, and to form a target resist pattern; and processing the semiconductor substrate using the target resist pattern as a mask.

A fifth aspect of the present invention inheres in a manufacturing method for a semiconductor device, including repeating processing for each of a plurality of exposure tools including: projecting a first periodic mask pattern formed in an opaque film of an inspection photomask, onto a resist film on a semiconductor substrate; projecting a second mask pattern including an opaque portion formed in the opaque film and an opening portion surrounding the opaque portion, onto the resist film, so as to overlay the opaque portion on a region of the resist film where the first mask pattern is projected; forming a plurality of resist images corresponding to the periodic pattern; measuring a line width distribution of the resist images in a repeating direction of the resist images; and measuring a line width variation in an end portion of the resist images from an average value of the line widths in a center portion of the resist images, and a variation distance from the end portion to a position of the line width distribution reaching a variation tolerance of the line widths; classifying the exposure tools based on the line width variation and the variation distance; selecting a target exposure tool for a photolithography process from among the exposure tools; and executing the photolithography process using the target exposure tool.

A sixth aspect of the present invention inheres in a computer program product configured to be executed by a computer, including an instruction to acquire a projection light intensity distribution on a semiconductor substrate measured by transferring a monitor mask pattern of an inspection photomask onto the semiconductor substrate, the monitor mask pattern being a window pattern surrounded by an opaque film; an instruction to calculate a first ratio between an illumination light intensity at the monitor mask pattern and a first projection light intensity on the semiconductor substrate, the first projection light intensity calculated based on the monitor mask pattern; an instruction to calculate a distribution function of a local flare, due to a mask pattern coverage of the monitor mask pattern, based on the first ratio and the projection light intensity distribution; an instruction to divide a design mask pattern of a target photomask into a plurality of unit areas; an instruction to calculate a second ratio between the illumination light intensity on each of the unit areas and a second projection light intensity on the semiconductor substrate, the second projection light intensity calculated based on the design mask pattern; and an instruction to calculate a local flare intensity in each of the unit areas, based on the second ratio and the distribution function.

DETAILED DESCRIPTION OF THE INVENTION

Figure 1:
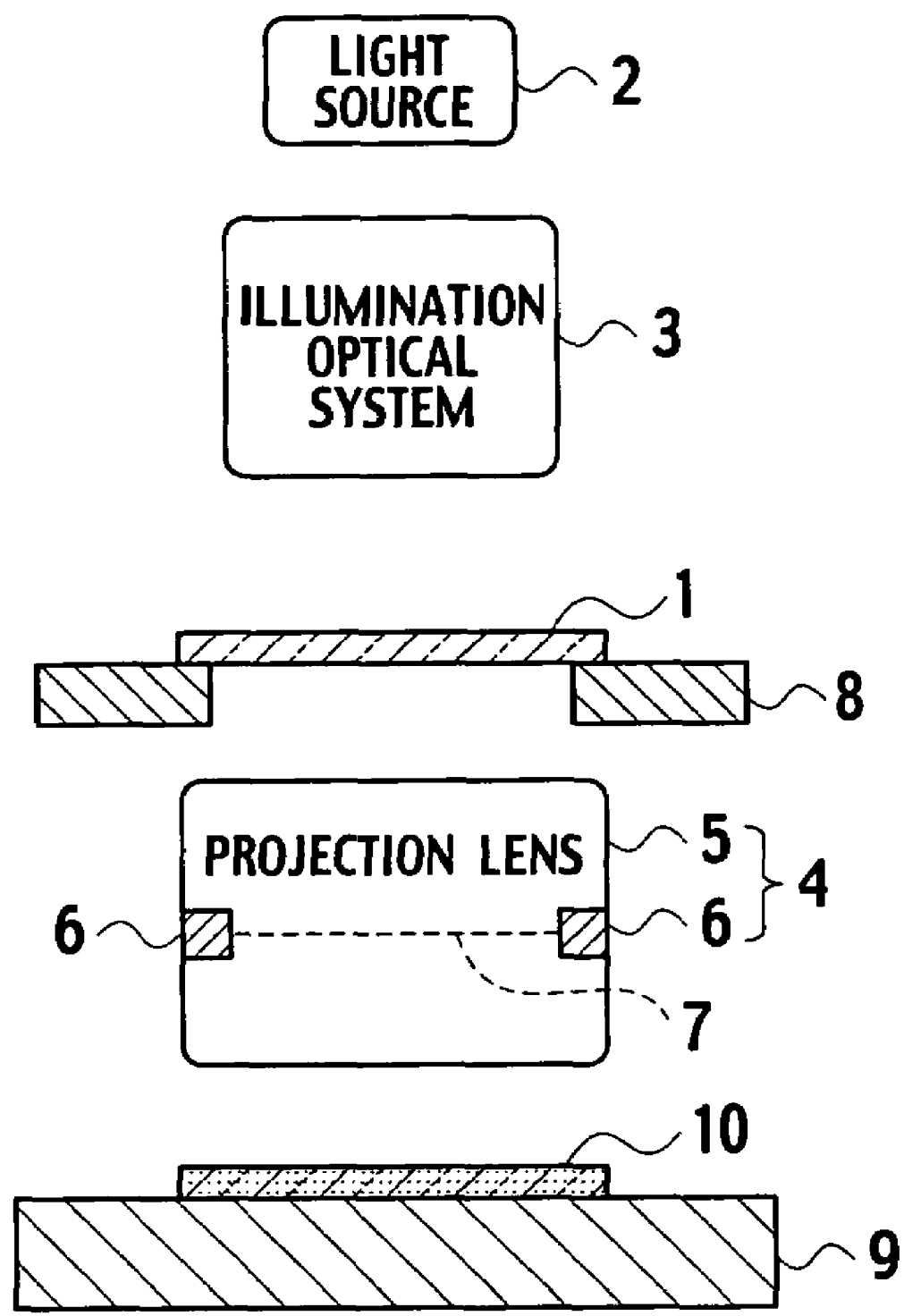
FIG. 1 is a schematic block diagram of an exposure tool for explaining embodiments of the present invention.

Various embodiments of the present invention will be described with reference to the accompanying drawings. It is to be noted that the same or similar reference numerals are applied to the same or similar parts and devices throughout the drawings, and the description of the same or similar parts and devices will be omitted or simplified.

An exposure tool to be used for description of an evaluation method of a dimensional variation in a resist pattern on a mask pattern coverage according to first and second embodiments of the present invention is a refraction type projection reduction exposure tool (scanner), as shown in FIG. 1. A reduction ratio of the scanner is ¼. An argon fluoride (ArF) excimer laser having a wavelength $\lambda$ of 193 nm is used as a light source 2. An illumination optical system 3 includes a fly's eye lens, an illumination aperture, a condenser lens and the like, which are omitted in the drawing. A projection optical system 4 includes a projection lens 5, an aperture stop 6 and the like. A pupil 7 is a plane surrounded by the aperture stop 6. By an exposure light transmitted from the light source 2, a pattern of a photomask 1 placed on a mask stage 8 between the illumination optical system 3 and the projection optical system 4, is demagnified and projected onto a semiconductor substrate 10 on a substrate stage 9.

Note that, although the scanner has been illustrated as an exposure tool for convenience of description, other than the scanner, a stepper or the like is also applicable. In addition, although the reduction ratio is set ¼, an arbitrary reduction ratio is also permissible. Furthermore, the exposure tool is not limited to the refraction type. However, a reflection type and a catadioptric type exposure tools may be used. In the following descriptions, a dimension of the pattern on the photomask 1 is described in terms of a dimension demagnified and projected on the semiconductor substrate 10, unless otherwise indicated.

FIRST EMBODIMENT

Figure 2:
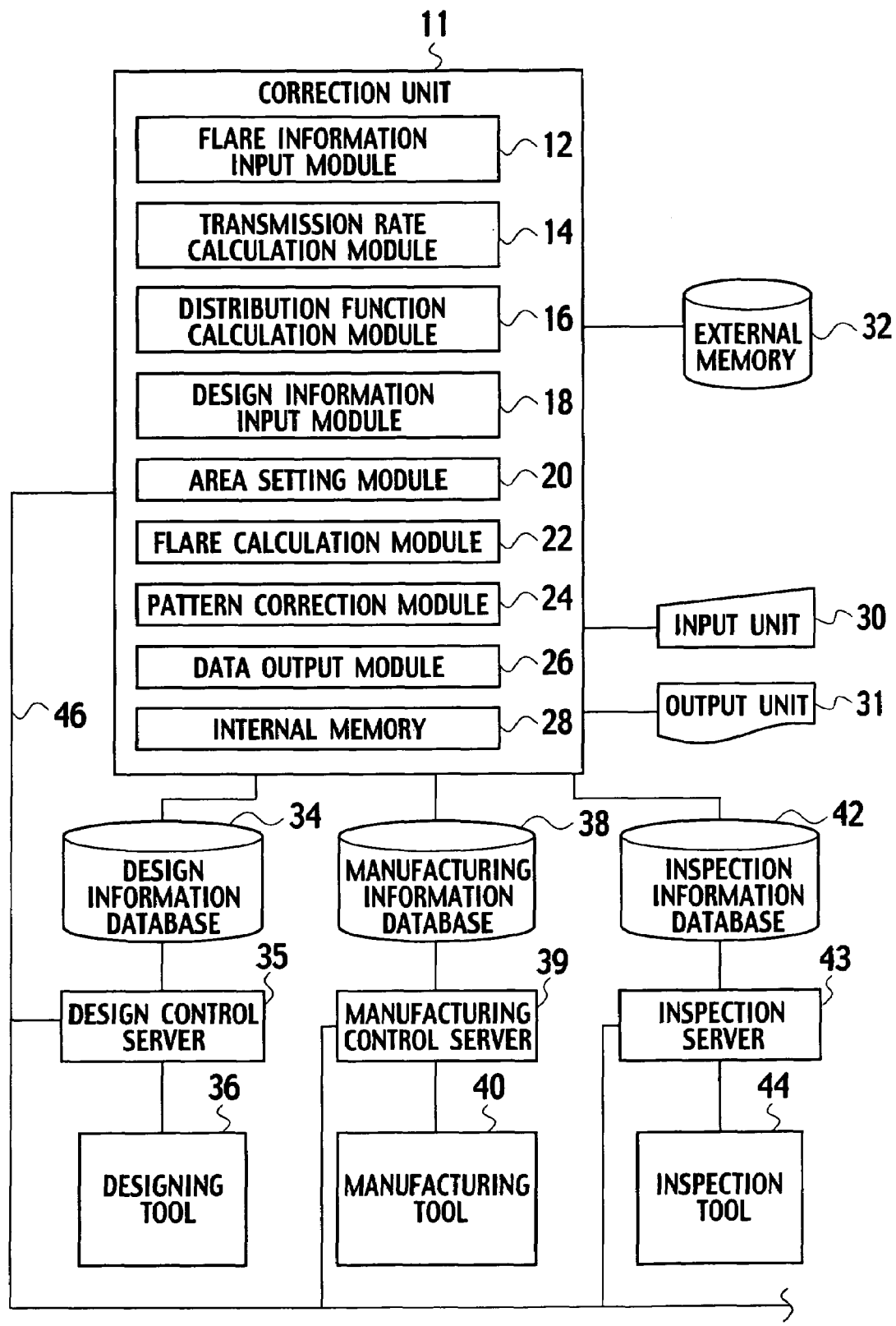
FIG. 2 is a schematic block diagram showing an example of a correction system of a mask pattern according to a first embodiment of the present invention.

A correction system for a mask pattern according to a first embodiment of the present invention includes an input unit 30, an output unit 31, an external memory 32, a design information database 34, a manufacturing information database 38, an inspection information database 42, and a correction unit 11, as shown in FIG. 2. The design information database 34 is accessed by a design control server 35 for controlling a designing tool 36. The manufacturing information database 38 is accessed by a manufacturing control server 39 for controlling a manufacturing tool 40. The inspection information database 42 is accessed by an inspection server 43 for controlling an inspection tool 44. The correction unit 11 includes a flare information input module 12, a transmission rate calculation module 14, a distribution function calculation module 16, a design information input module 18, an area setting module 20, a flare calculation module 22, a pattern correction module 24, a data output module 26, and an internal memory 28. The correction unit 11, the design control server 35, the manufacturing control server 39, the inspection server 43 and the like, are connected to one another through a communication network 46, such as a local area network (LAN).

The input unit 30 may be devices, such as a keyboard and a mouse. When an input operation is performed from the input unit 30, information concerning corresponding key information is transmitted to the correction unit 11. The output unit 31 may be a screen, such as a monitor including such as a liquid crystal display (LCD), a light emitting diode (LED) panel, an electroluminescent (EL) panel or the like. The output unit 31 is controlled by the correction unit 11. The output unit 31 displays design mask pattern data acquired by the design information input module 18, a calculation results implemented by the transmission rate calculation module 14, the distribution function calculation module 16, and the flare calculation module 22 and the like, mask pattern data corrected by the pattern correction module 24, and the like. The external memory 32 stores programs so that the correction unit 11 can implement operations for evaluating dependence on a mask pattern coverage, and for correcting the mask pattern. In addition, the internal memory 28 or the external memory 32 of the correction unit 11 temporarily stores data obtained during calculation and an analysis during the operation of the correction unit 11.

The designing tool 36 may be such as a computer-assisted design (CAD) system, and a pattern generator (PG), for designing a circuit of a semiconductor device, a layout of a photomask and the like, creating mask pattern data, fabricating a photomask, and the like. Circuit specifications of the semiconductor device and mask pattern data of the circuit, which are designed by the CAD system, are stored in the design information database 34 by the design control server 35. In addition, monitor mask pattern data and the like for an inspection photomask, which is used for evaluating performances, such as a local flare of an exposure tool, is also stored in the design information database 34. Based on the mask pattern data stored in the design information database 34, a plurality of photomasks for manufacturing a semiconductor device are fabricated by the PG of the designing tool 36 or an external mask maker.

The manufacturing tool 40 includes various manufacturing apparatuses provided in manufacturing facilities for manufacturing semiconductor devices. The manufacturing apparatuses include a chemical vapor deposition (CVD) apparatus, an oxidation apparatus, an annealing apparatus, an exposure tool, a developer, an etcher, a evaporator, and the like. The manufacturing apparatuses respectively execute various manufacturing processes of a semiconductor device, and various performance tests, based on process conditions acquired from the manufacturing control server 39. For example, an image pickup device, such as a charge-coupled device (CCD), is placed in the exposure tool shown in FIG. 1. Performance tests, such as distributions of illumination light intensity and projection light intensity, are executed as needed. The manufacturing control server 39 stores performance test data executed by each of the manufacturing apparatuses, as apparatus information, into the manufacturing information database 38. For example, an intensity distribution of projection light of the monitor mask pattern of the inspection photomask, which is measured by the image pickup device in the exposure tool, is stored, as measured data of a local flare, in the manufacturing information database 38.

The inspection tool 44 includes various inspection apparatuses for inspecting and measuring the processed semiconductor substrate 10 after the respective processes for manufacturing the semiconductor device are finished. The inspection apparatuses include an optical microscope for surface observation, a transmission electron microscope (TEM) for structural analysis, a scanning electron microscope (SEM) for surface observation and structural analysis, a tester for measuring electrical characteristics, and the like. The inspection server 43 stores inspection data obtained by the various inspection apparatuses with regard to the semiconductor substrate 10 for a performance test and the semiconductor device manufactured by the manufacturing tool 40, in the inspection information database 42. For example, the measured data of the local flare which relates to a local flare distribution is stored, as inspection date, in the inspection information database 42. The local flare is measured from a resist image transferred from the monitor mask pattern of the inspection photomask by the exposure tool.

The flare information input module 12 in the correction unit 11 acquires the monitor mask pattern data of the inspection photomask to be used to measure the local flare distribution of the exposure tool provided in the manufacturing tool 40, from the design information database 34. In addition, the flare information input module 12 acquires the measured data of the local flare of the exposure tool from the manufacturing information database 38 or the inspection information database 42. The transmission rate calculation module 14 calculates a ratio between an illumination light intensity for the monitor mask pattern and a projection light intensity on the semiconductor substrate 1, as an effective transmission rate, based on the monitor mask pattern data of the inspection photomask, which has been acquired by the flare information input module 12. The distribution function calculation module 16 derives a distribution function of the local flare from a fitting calculation or the like, based on the measured data of the local flare, which has been acquired by the flare information input module 12, and the effective transmission rate, which has been calculated by the transmission rate calculation module 14.

The design information input module 18 acquires, from the design information database 34, a mask pattern data of a target photomask for manufacturing the semiconductor device, which is a target for mask pattern correction. The area setting module 20 divides the mask pattern of the target photomask into unit areas, which have been acquired by the design information input module 18. The flare calculation module 22 calculates an effective transmission rate in each of the unit areas. Moreover, the flare calculation module 22 calculates a local flare intensity in each of the unit areas, based on the distribution function derived by the distribution function calculation module 16 and the effective transmission rate calculated in each of the unit areas. The pattern correction module 24 corrects the mask pattern of the target photomask, based on the intensity distribution of the local flare calculated by the flare calculation module 22. The data output module 26 stores the mask pattern data which has been corrected by the pattern correction module 24, into the design information database 34.

The correction unit 11 according to the first embodiment calculates the intensity distribution of the local flare, based on the distribution function of the local flare of the exposure tool, which is acquired by the monitor mask pattern of the inspection photomask, and the effective transmission rate which is calculated from the mask pattern of the target photomask. The distribution function of the local flare is a specific characteristic of the optical system of the exposure tool. In addition, the effective transmission rate is a characteristic depending on the mask pattern. If a distribution function of the local flare is preliminarily derived for each of the exposure tools, dependence of the local flare on the mask pattern coverage can be easily and accurately evaluated, by calculating an effective transmission rate of a mask pattern of an arbitrary target photomask. Additionally, a dimensional variation in the resist pattern can be accurately evaluated from the calculated intensity distribution of the local flare. Therefore, the mask pattern can be corrected with high accuracy.

Figure 3:
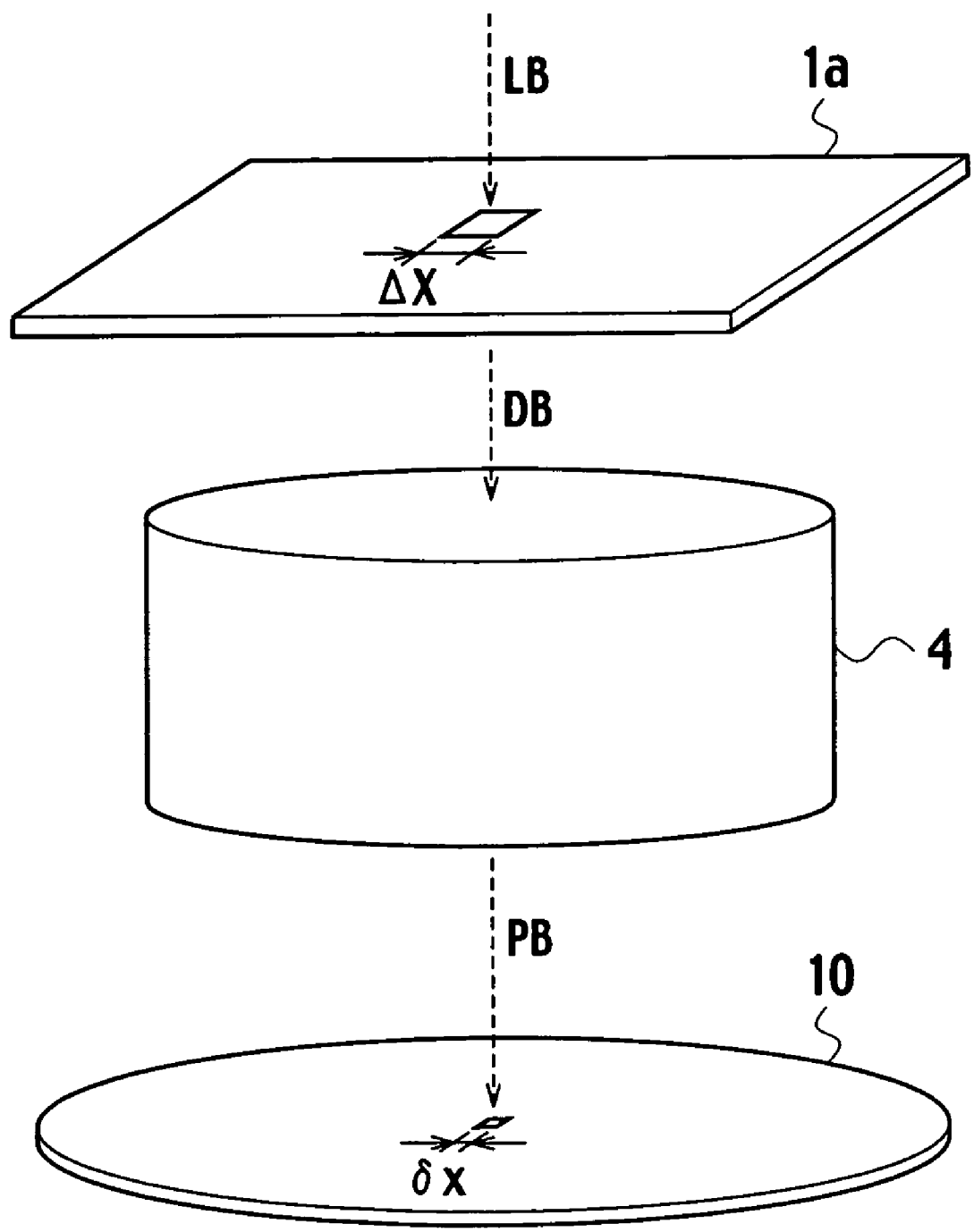
FIG. 3 is a schematic diagram showing an example of a local flare.

Next, descriptions will be provided for a method for evaluating the dependence on the mask pattern coverage and a method for correcting the mask pattern according to the first embodiment. In the case of the first embodiment, as shown in FIG. 3, an intensity distribution of projection light of an inspection photomask 1$a$ is measured in the exposure tool provided in the manufacturing tool 40. From an illumination light LB illuminating the inspection photomask 1$a$ in the exposure tool, a diffracted light DB, which has passed through an area element with a width $\Delta X$ on the inspection photomask 1$a$, is incident to the projection optical system 4. A projection light PB exiting from the projection optical system 4 is projected onto an area element with a width $\delta x$ on the surface of the semiconductor substrate 10. A ratio of $\Delta X$ to $\delta x$ is ideally equal to the reduction ratio of the exposure tool of about 4:1.

Figure 4:
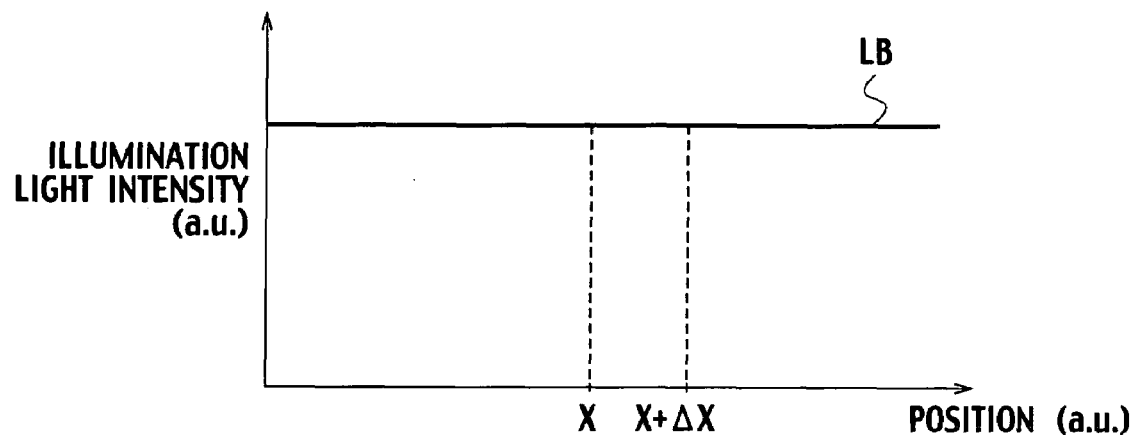
FIG. 4 is a diagram showing an example of an illumination light intensity distribution used for explaining the local flare.
Figure 5:
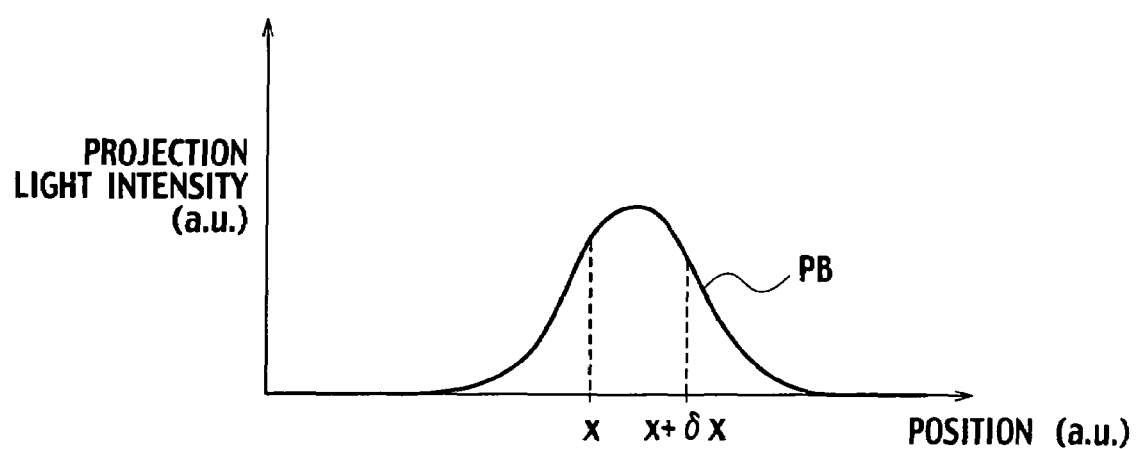
FIG. 5 is a diagram showing an example of a projection light intensity distribution used for explaining the local flare.

The illumination light LB has an almost uniform intensity on the entire surface of the inspection photomask 1$a$, as shown in FIG. 4. In the projection light PB corresponding to the illumination light LB on the area element with the width $\Delta X$ in an arbitrary position X on the inspection photomask 1$a$, the intensity distribution occurs in a periphery of the area element with the width $\delta x$ in a position x on the surface of the semiconductor substrate 10. Thus, a diffused light distributed in a periphery of a projected aerial image, is defined as a local flare. Since an intensity of the aerial image depends on the mask pattern coverage, the local flare also depends on the mask pattern coverage. Furthermore, the local flare is not the diffraction light from the mask pattern. The local flare is a diffused light, for example, due to minute unevenness on the surface of the projection lens 5 in the projection optical system 4 shown in FIG. 1, or by minute change in a refraction index of the interior of the projection lens 5. Additionally, in a case where the projection optical system 4 includes a reflecting mirror, the minute unevenness of the surface of the reflecting mirror also causes a diffused light.

Figure 6:
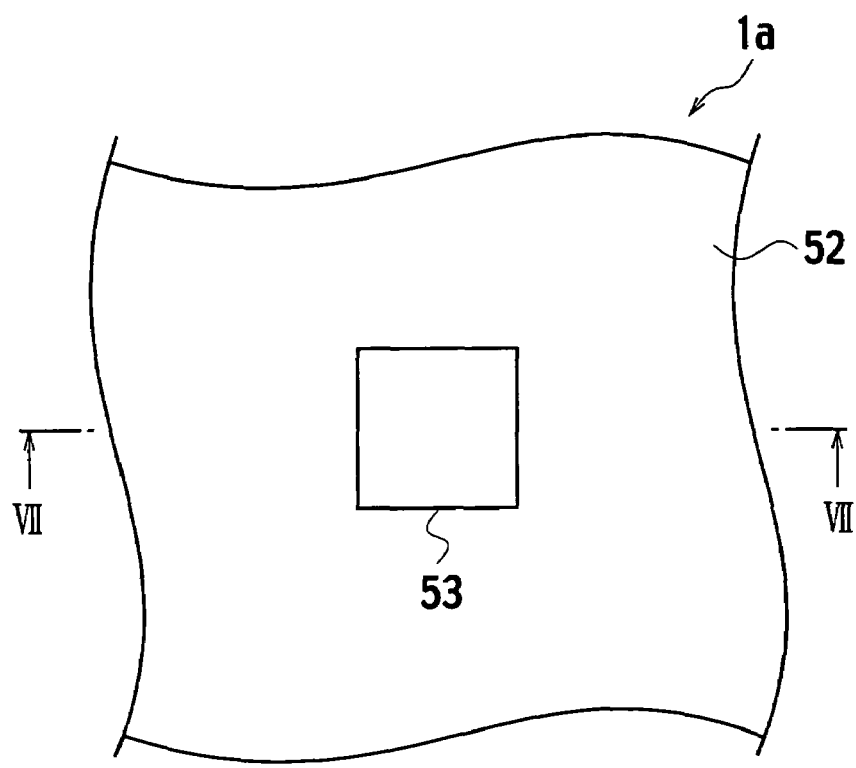
FIG. 6 is a plan view showing an example of an inspection photomask according to the first embodiment of the present invention.
Figure 7:
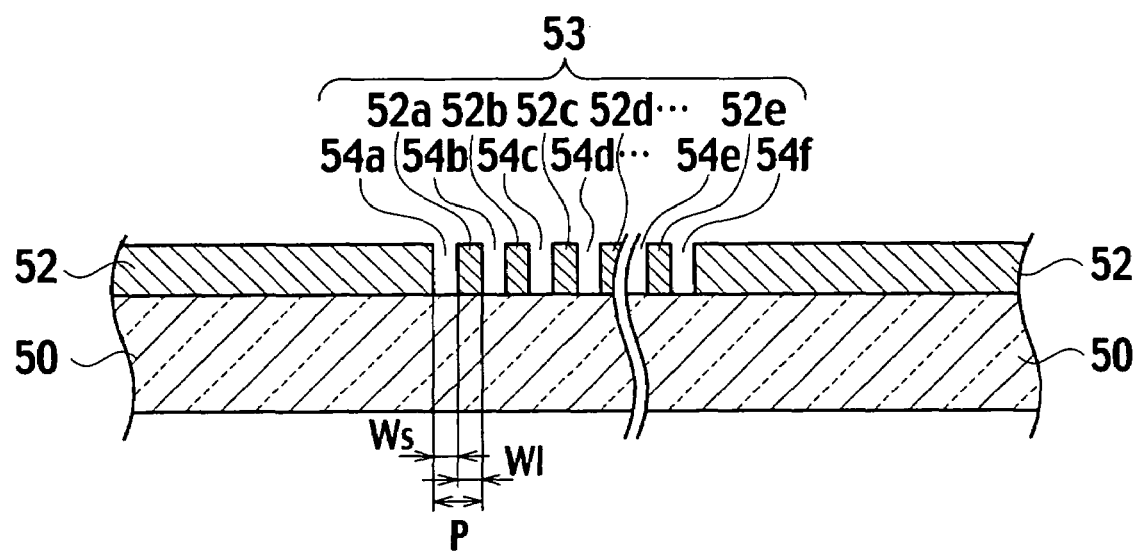
FIG. 7 is a cross sectional view of the inspection photomask taken along line VII-VII in FIG. 6.

As shown in FIGS. 6 and 7, the inspection photomask 1$a$ includes a rectangular monitor mask pattern 53 being a window pattern surrounded by an opaque film 52 on a surface of a mask substrate 50 of a transparent material, such as fused silica. A L/S pattern with a predetermined period P is used for the monitor mask pattern 53. In the L/S pattern of the monitor mask pattern 53, a plurality of opaque films 52$a$, 52$b$, 52$c$, 52$d$, ..., and 52$e$ with a line width Wl are respectively arranged between each neighboring two of a plurality of opening portions 54$a$, 54$b$, 54$c$, 54$d$, ..., 54$e$ and 54$f$ with a space width Ws. A ratio of the space width Ws to the line width Wl is, for example, about 1 to 1 on the inspection photomask 1$a$. The opaque film 52 in the periphery of the monitor mask pattern 53 extends from the end portion of the monitor mask pattern 53, for example, to at least about 10 μm to about 1000 μm, desirably to about 50 μm to about 500 μm, and more desirably to about 100 μm to about 300 μm.

Figure 8:
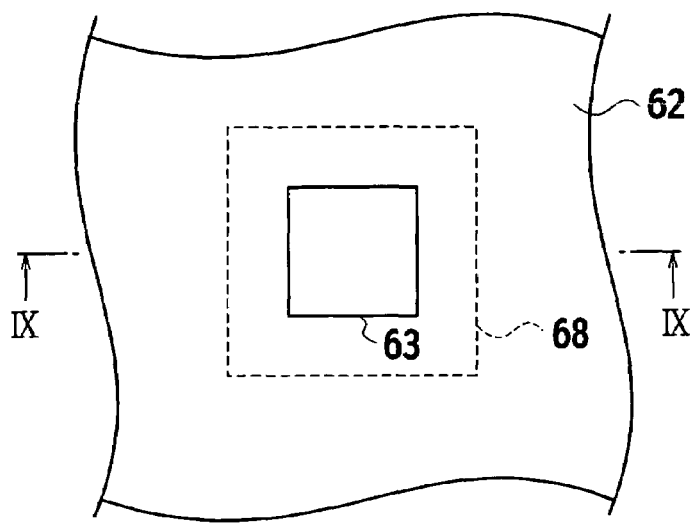
FIG. 8 is a plan view showing an example of a transferred resist pattern on a semiconductor substrate from the inspection photomask according to the first embodiment of the present invention.
Figure 9:
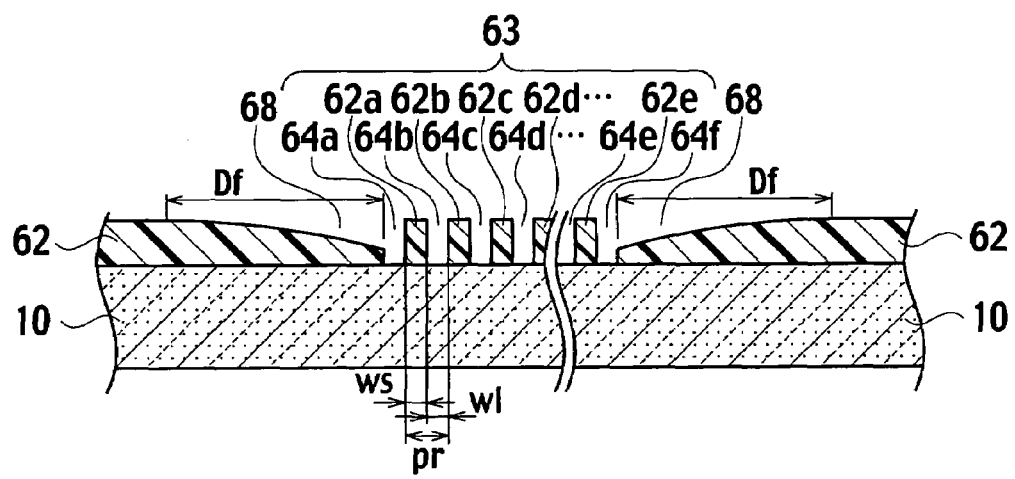
FIG. 9 is a cross sectional view of the transferred resist pattern taken along line IX-IX in FIG. 8.

The inspection photomask 1$a$ and the semiconductor substrate 10, coated with a photoresist, are loaded on the exposure tool provided in the manufacturing tool 40 shown in FIG. 2. The monitor mask pattern 53 is projected so as to transfer a monitor resist pattern 63 onto a resist film 62 on the surface of the semiconductor substrate 10, as shown in FIGS. 8 and 9. In the transferred monitor resist pattern 63, a plurality of resist images 62$a$, 62$b$, 62$c$, 62$d$, ..., and 62$e$ with a width wl are respectively formed between each neighboring two of a plurality of opening portions 64$a$, 64$b$, 64$c$, 64$d$, ..., 64$e$ and 64$f$ with a space width ws in a period pr. Moreover, a local flare image 68, in which a film thickness decreases due to dissolution of the resist film 62, is formed in a surrounding area within a distance Df from the end portion of the monitor resist pattern 63. The local flare image 68 is a resist pattern formed by a part of projection light diffused from the end portion of the monitor mask pattern 53 shown in FIG. 6 towards the opaque film 52 due to diffusion of the projection light.

Figure 10:
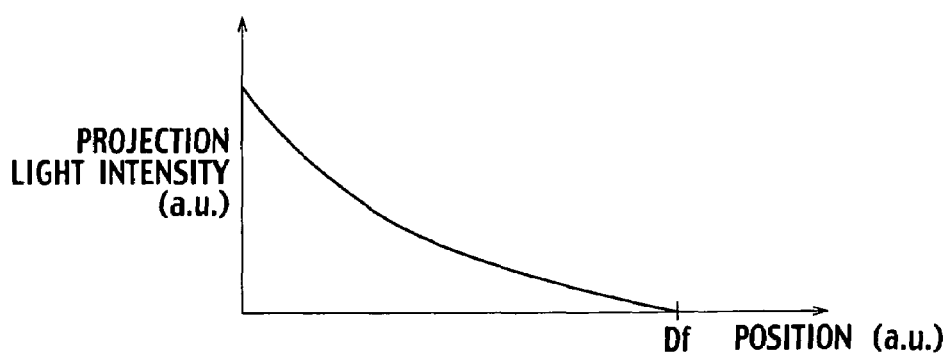
FIG. 10 is a diagram showing an example of a projection light intensity distribution on the semiconductor substrate from the inspection photomask according to the first embodiment of the present invention.

With regard to the local flare image 68, a thickness distribution of the resist film 62 is measured in the surrounding area within the distance Df from the end portion of the monitor resist pattern 63 by use of a film thickness measurement apparatus and the like, provided in the inspection tool 44 shown in FIG. 2. The decrease of the thickness in each position of the resist film 62 is converted into an intensity of the projection light based on a sensitivity characteristic of the photoresist. As a result, a distribution of the projection light intensity (hereinafter referred to as a "local flare distribution") is provided, as shown in FIG. 10. The local flare distribution is stored, as measured data of the local flare, in the inspection information database 42 by the inspection server 43. The local flare distribution can also be obtained by directly measuring the intensity of the projection light using the image pickup device placed in the exposure tool in the manufacturing tool 40. The measured data of the local flare by the manufacturing tool 40 is stored in the manufacturing information database 38 by the manufacturing control server 39.

The measured data $F_M(x,y)$ of the local flare of the exposure tool is acquired by the flare information input module 12, in the correction unit 11, from the inspection information database 42 or the manufacturing information database 38. The local flare distribution on the semiconductor substrate 10, onto which the monitor mask pattern 53 is projected, can be approximately expressed by the convolution of $I_0(x,y)$ and $P(x,y)$, as follows, $$F_M(x,y) = \iint I_0(m,n) \times P(x-m, y-n) dm dn \qquad (1).$$

Here, $I_0(x,y)$ is an ideal image which has no flare, and $P(x,y)$ is a distribution function representing a local flare distribution characteristic of the projection optical system 4.

The distribution function $P(x,y)$ can be expressed, for example, by a Gaussian function, as follows, $$P(x,y) = A \times \exp(-b \times r^2) \qquad (2).$$

Here r denotes a distance $(x^2+y^2)^{1/2}$ from the end portion of the monitor resist pattern 63. The constant A denotes a fraction of a local flare component in a luminous flux incident to the projection optical system 4. The constant A has a value of more than 0 and less than one. The constant b denotes a spreading distance of the local flare. In a case where the constant b is larger, the local flare spreads only in a short distance. On the contrary, in a case where the constant b is smaller, the local flare spreads over a long distance.

It should be noted that the distribution function $P(x,y)$ is not limited to a Gaussian function. The distribution function $P(x,y)$ can be approximately represented by an arbitrary function, as shown by Expression (3) or (4), for example, which converges to 0 when the distance r is infinitely large.

$$P(x,y) = A \times \exp(-b \times r) \qquad (3)$$

$$P(x,y) = A / (b^2 \times r^2) \qquad (4)$$

The ideal image $I_0(x,y)$ needs to be obtained in order to calculate the distribution function $P(x,y)$. The ideal image $I_0(x,y)$ is the aerial image of the monitor mask pattern 53. As the ideal image $I_0(x,y)$, the "effective transmission rate" which is obtained in the following method can be used.

(a) The monitor mask pattern 53 is divided into rectangular area elements. The area element is provided by a length equivalent to one period in a repeating direction of the period P of the monitor mask pattern, and by an adequate length in an orthogonal direction to the repeating direction of the period P.

Figure 11:
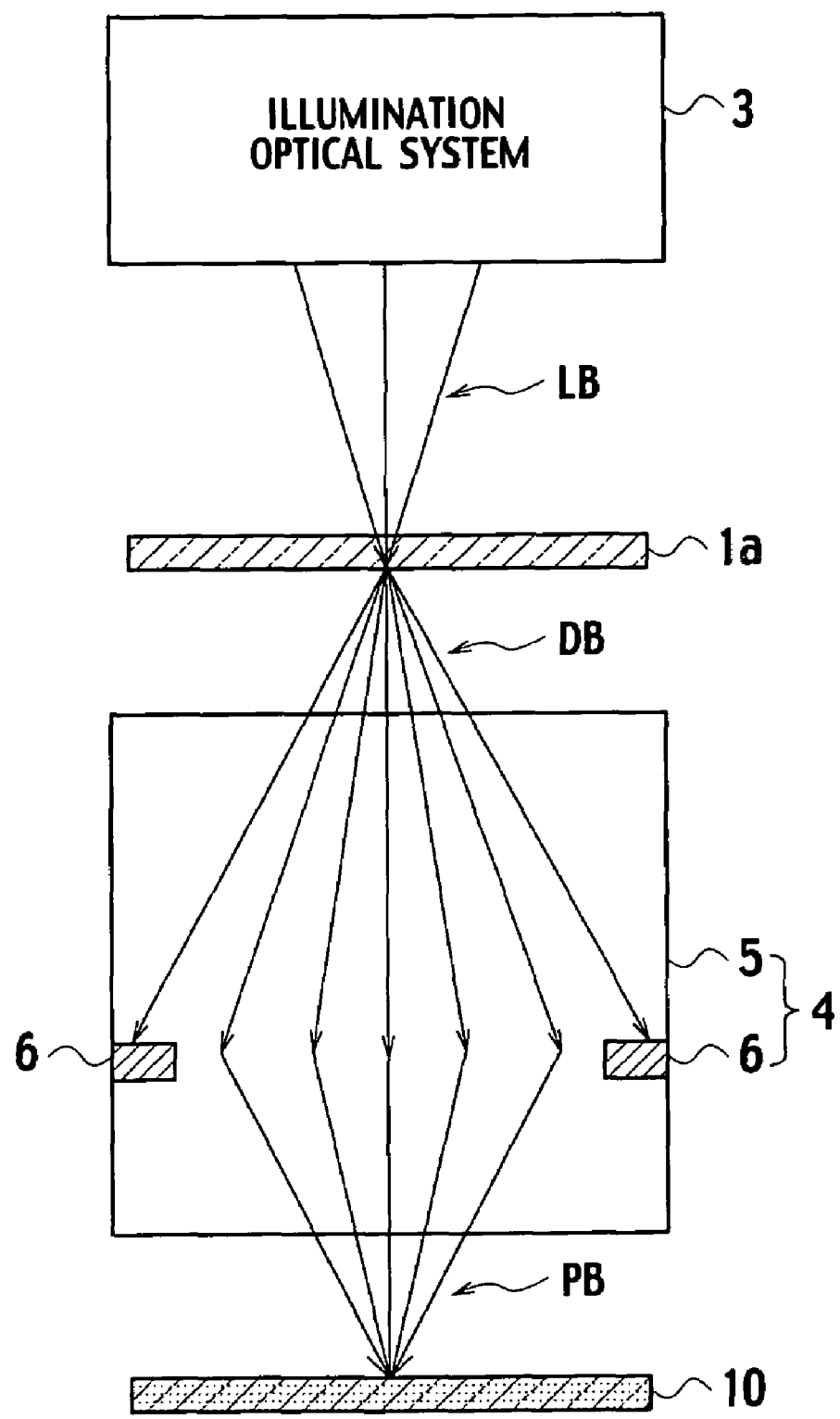
FIG. 11 is a schematic diagram showing an example of an effective transmission rate from the inspection photomask according to the first embodiment of the present invention.

(b) A sum of the projection light intensity reaching the semiconductor substrate 10 after passing through the area element is calculated while a sum of intensity of light incident to the area element on the inspection photomask 1a is set to one. A photolithography simulation is used for the calculation. The inspection photomask 1a is illuminated by the illumination light LB from the illumination optical system 3, as shown in FIG. 11. The sum of intensity of projection light PB is obtained by excluding a component shielded by the aperture stop 6 from diffracted light DB. The diffracted light is incident on the projection lens 5 of the projection optical system 4 from the area element in the inspection photomask 1a. The sum of the intensity of the projection light is divided by an area of the area element of the inspection photomask 1a to obtain the effective transmission rate. The sum of the projection light intensity may be calculated from the aerial image of the area element of the inspection photomask 1a on the semiconductor substrate 10. Otherwise, a two-dimensional fourier transform is applied to the aerial image of the area element of the inspection photomask 1a to calculate a two-dimensional function. A value at the coordinate origin (0,0) in the space-frequency of the two-dimensional function may be calculated as the effective transmission rate.

Figure 12:
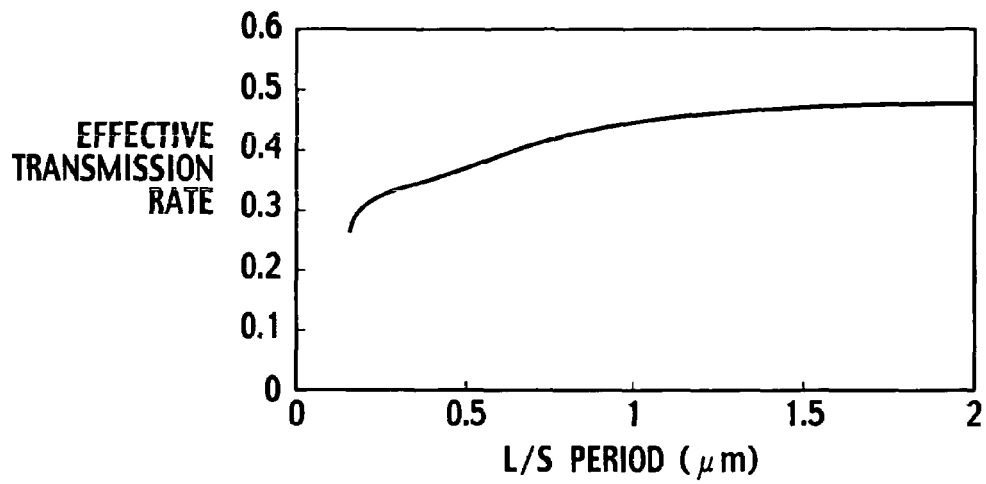
FIG. 12 is a diagram showing an example of dependence of the effective transmission rate on a period of a L/S pattern according to the first embodiment of the present invention.

The monitor mask pattern 53 is the L/S pattern in which a ratio of the line width Wl to the space width Ws is about 1:1 on the inspection photomask 1a, as shown in FIG. 7. A calculated effective transmission rate $T_M$ of the L/S pattern varies depending on the period P of the L/S pattern, as shown in FIG. 12. Illumination conditions such as a numerical aperture NA of the projection lens 5 of 0.75, a coherence factor σ of the illumination optical system 3 of 0.85, and an annular shield ratio of the annular illumination of ⅔, are used. As the period P of the L/S pattern becomes as minute as the wavelength of the illumination light exiting from the light source 2 of the exposure tool, the effective transmission rate $T_M$ decreases from about 0.5 to about 0.2. Thus, the local flare heavily depends not only on the mask pattern coverage but also on the period of the L/S pattern. In addition, the effective transmission rate $T_M$ also changes depending on the illumination conditions. Consequently, it is desirable to use a value of the effective transmission rate $T_M$ obtained by illumination conditions for photolithography used in a manufacturing process of a semiconductor device.

The flare information input module 12 reads in the monitor mask pattern data of the inspection photomask 1a from the design information database 34. The transmission rate calculation module 14 calculates the effective transmission rate $T_M$ in the area of the monitor mask pattern 53 through the aforementioned procedure. On the other hand, since the periphery of the monitor mask pattern 53 is an area where light is shielded by the opaque film 52, an effective transmission rate is 0. Consequently, $I_0(x,y)$ and $F_M(x,y)$ in expression (1) are respectively represented, as follow, $$I_0(x,y) = T_M \text{ (within the monitor resist pattern) 0 (in the periphery of the monitor resist pattern)} \qquad (5)$$

$$F_M(x,y) = \iint T_M \times P(x-m, y-n) dm dn \qquad (6).$$

The distribution function calculation module 16 calculates the constants A and b of the distribution function P(x,y) of the local flare from a least squares method by fitting the measured data of the local flare into expression (6). Here, a range of the integral of expression (6) over dmdn is within the monitor resist pattern 63 shown in FIG. 8. Consequently, the integral of expression (6) can be expanded by use of an error function or the like, so that the least squares method can be easily executed.

Figure 13:
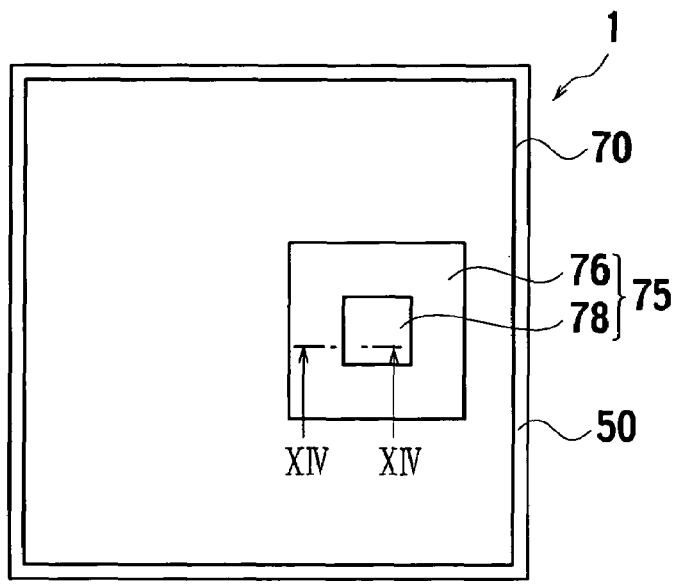
FIG. 13 is a plan view showing an example of a target photomask according to the first embodiment of the present invention.
Figure 14:
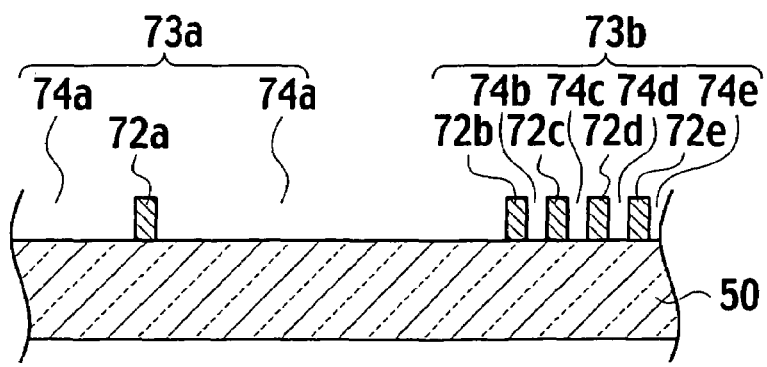
FIG. 14 is a cross sectional view of the target photomask taken along line XIV-XIV in FIG. 13.

The design information input module 18 shown in FIG. 2 acquires the design mask pattern data to be corrected in view of the local flare, from the design information database 34. As shown in FIG. 13, a target photomask 1 includes a memory circuit pattern area 75, which has a rectangular memory cell array area 78 and a peripheral circuit area 76, in a mask pattern area 70 arranged on the surface of the mask substrate 50. The peripheral circuit area 76 is arranged in the periphery of the memory cell array area 78. A peripheral circuit pattern 73a and a memory cell array pattern 73b, as the design mask pattern, are arranged respectively in the peripheral circuit area 76 and the memory cell array area 78, as shown in FIG. 14.

In the peripheral circuit pattern 73a, an isolated opaque film 72a is surrounded by an opening portion 74a which is wider than the opaque film 72a, so that the mask pattern coverage is small. On the other hand, the memory cell array pattern 73b is a dense L/S pattern having opaque portions 72b, 72c, 72d, and 72e and opening portions 74b, 74c, 74d and 74e, so that the mask pattern coverage is large. Depending on the mask pattern coverage, the local flare caused by the projection light onto a peripheral circuit area 76 is distributed so as to overlap with the projection light of the memory cell array area 78 on the semiconductor substrate 10. As a result, a line width of the transferred resist image of the opaque portions 72b to 72e of the memory cell array pattern 73, varies depending on the intensity of the local flare.

Figure 15:
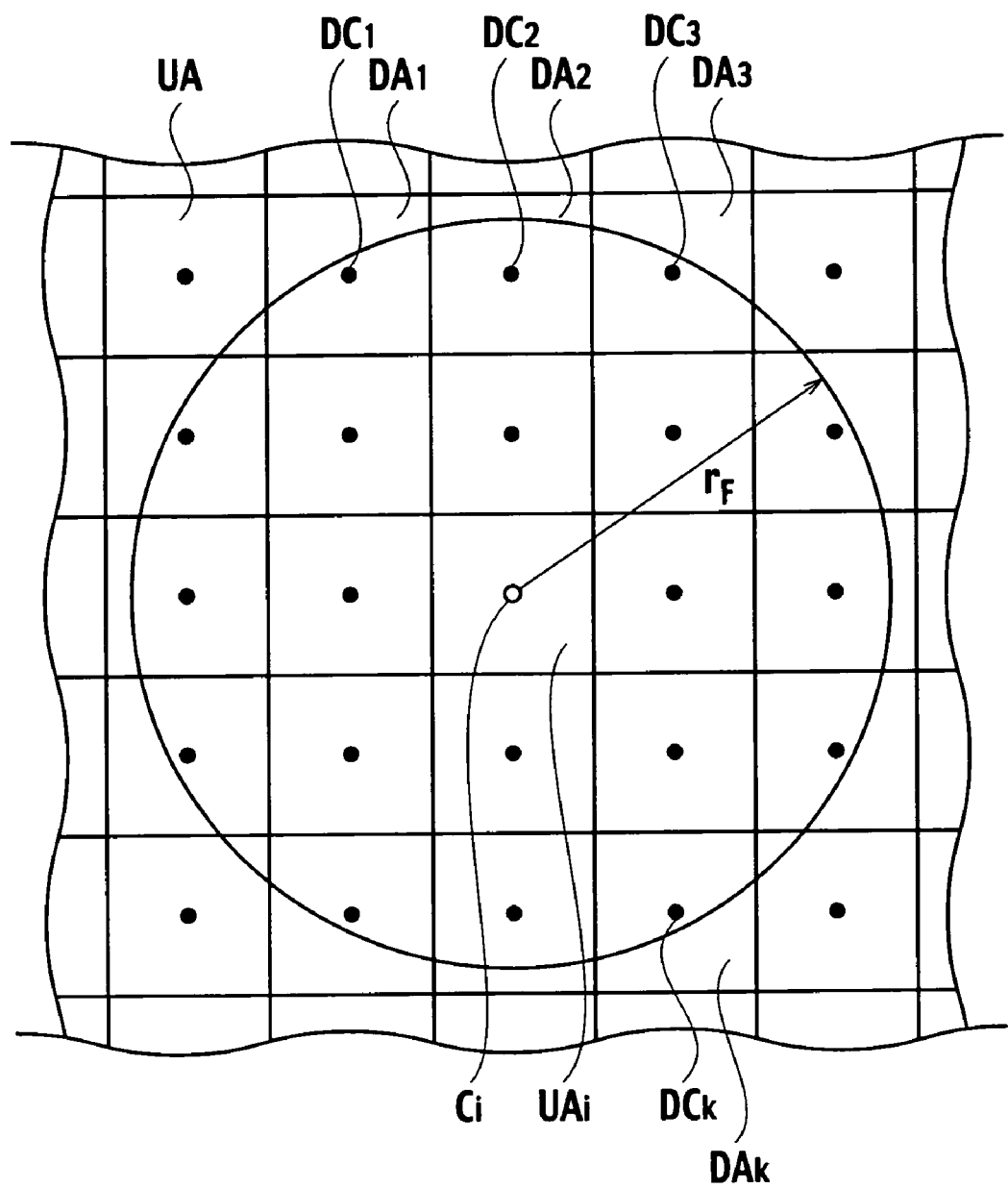
FIG. 15 is a diagram showing an example of a dividing method of a unit area for calculating the effective transmission rate according to the first embodiment of the present invention.

The area setting module 20 shown in FIG. 2 divides the design mask pattern, so as to set up a plurality of unit areas UA, as shown in FIG. 15. The unit areas UA are partitioned with a lattice-shaped pattern in a square, for example, of 10 μm on a side. The flare calculation module 22 calculates an effective transmission rate T in each of the unit areas UA. A method for calculating the effective transmission rate T is the same as the method which has been described for the transmission rate calculating module 14 and shown in FIG. 11. Furthermore, the flare calculation module 22 derives an intensity distribution F(x,y) of the local flare, by use of the effective transmission rate and the distribution function P(x,y) of the local flare, as follows, $$F(x,y)=\int\int T \times P(x-m,y-n) dmdn \quad (7).$$

It should be noted that the processing may be implemented in accordance with the following rules in order to simplify the calculation of the intensity distribution F(x,y) of the local flare.

Rule (a): An average of effective transmission rate of each unit area UA is used as the effective transmission rate.

Rule (b): In calculation of the intensity distribution F(x,y), a position of each unit area UA is defined by a center position of each unit area UA.

Rule (c): An intensity of the local flare in each unit area UA is defined by a value of an intensity of the local flare at the center position in each unit area UA.

Figure 16:
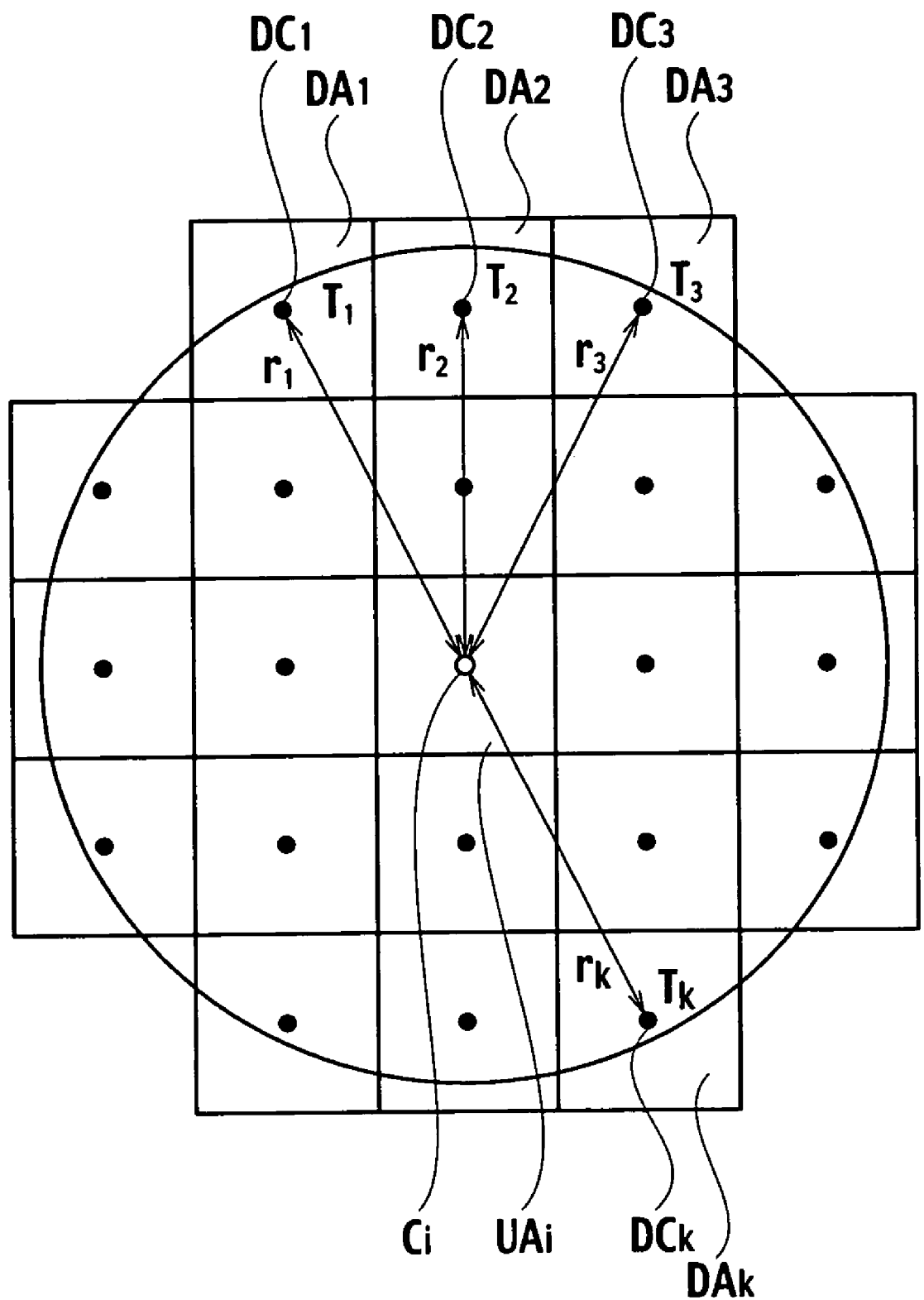
FIG. 16 is a diagram showing an example of a unit area for calculating the effective transmission rate according to the first embodiment of the present invention.

For example, unit areas $DA_1$, $DA_2$, $DA_3$, ..., and $DA_K$ are newly set up in a way that center positions $DC_1$, $DC_2$, $DC_3$, ..., and $DC_K$ of the unit areas $DA_1$, $DA_2$, $DA_3$, ..., and $DA_K$ are positioned within a range within a distance $r_F$ from the center position $C_i(x_i,y_i)$ of a target unit area $UA_i$ (i=1, 2, 3, ... ). Here, the distance $r_F$ denotes a distance where a significant amount of the local flare is distributed, as shown in FIG. 15. In accordance with Rules (a) and (b), effective transmission rates $T_1$, $T_2$, $T_3$, ..., $T_k$ of the newly set-up unit areas $DA_1$, $DA_2$, $DA_3$, ..., $DA_K$, and distances $r_1$, $r_2$, $r_3$, ..., $r_k$ from the center position $C_i(x_i,y_i)$ of the unit area $UA_i$ to the center positions $DC_1$, $DC_2$, $DC_3$, ..., $DC_K$ of the unit areas $DA_1$, $DA_2$, $DA_3$, ..., and $DA_K$, are obtained, as shown in FIG. 16.

Furthermore, in accordance with Rule (c), the integral of the intensity distribution F(x,y) of a local flare at the center position $C_i(x_i,y_i)$ of the unit area $UA_i$, expressed by expression (7) can be replaced with a summation, as follows, $$F(x_i,y_i)=T_1 \times A \times \exp(-b \times r_1^2) + T_2 \times A \times \exp(-b \times r_2^2) + \ldots + T_k \times A \times \exp(-b \times r_k^2) \quad (8).$$

Here, 1 to k on the right-hand side of expression (8) corresponds to the newly set-up unit areas $DA_1$, $DA_2$, $DA_3$, ..., $DA_k$, respectively. The flare calculation module 22 implements calculation of Expression (8) for each of the unit areas $UA_i$ (i=1 to n), to calculate the intensity distribution F(x,y) of the local flare.

Based on the intensity distribution F(x,y) of the local flare, the pattern correction module 24 corrects a shape of the design mask pattern of the target photomask 1. For example, a dimensional variation in a transferred resist pattern of the design mask pattern is obtained by use of a photolithography simulator. With regard to a part of a transferred resist pattern where the dimensional variation is determined to be larger than a reference value due to the local flare, the shape of the design mask pattern is corrected, so that the transferred resist pattern is formed in a desired shape. For the reference value to evaluate the dimensional variation, an error tolerance for dimensions of the circuit pattern of the semiconductor device is used.

The local flare depends on an intensity of the aerial image of the mask pattern. The intensity of the aerial image is not influenced by a transmission rate defined by a geometrical density of the mask pattern, but is influenced by optical factors, such as the illumination conditions of the exposure tool and a period of the mask pattern. In other words, the intensity of the aerial image is approximately in proportion to a fraction of a light component that reaches the semiconductor substrate 10 after passing through the projection lens 5, in the radiated light from the mask pattern, more specifically, the effective transmission rate. For the evaluation of the local flare, the dependence of the local flare on the mask pattern coverage including the optical factors, need to be taken into consideration.

In the case of an evaluation method according to the first embodiment, the distribution function of the local flare, which is a specific characteristic of the exposure tool, and the effective transmission rate of the mask pattern of the target photomask are calculated, so as to calculate the intensity distribution of the local flare. As a consequence, the dependence of the local flare on the mask pattern coverage can be easily evaluated with high accuracy. In addition, the dimensional variation in the resist pattern can be evaluated with high accuracy based on the calculated intensity distribution of the local flare. Thus it is possible to correct the mask pattern with high accuracy.

It should be noted that, in a case where an amount of correction of the design mask pattern is larger, so that the distribution of the effective transmission rates may be different from the distribution of the effective transmission rates before the correction, the correction might be insufficient or excessive. In such a case, the aforementioned procedure for correcting the target mask pattern is repeatedly implemented until the dimensional variation in the resist pattern caused by the local flare becomes sufficiently small. Thus, the mask pattern can be corrected with higher accuracy. Moreover, the local flare is a phenomenon different from the OPE, and the effect of the local flare appears in an area different from the OPE. Accordingly, the method for correcting the mask pattern according to the first embodiment can be applied in conjunction with the correcting of the mask pattern by the OPE.

Figure 17:
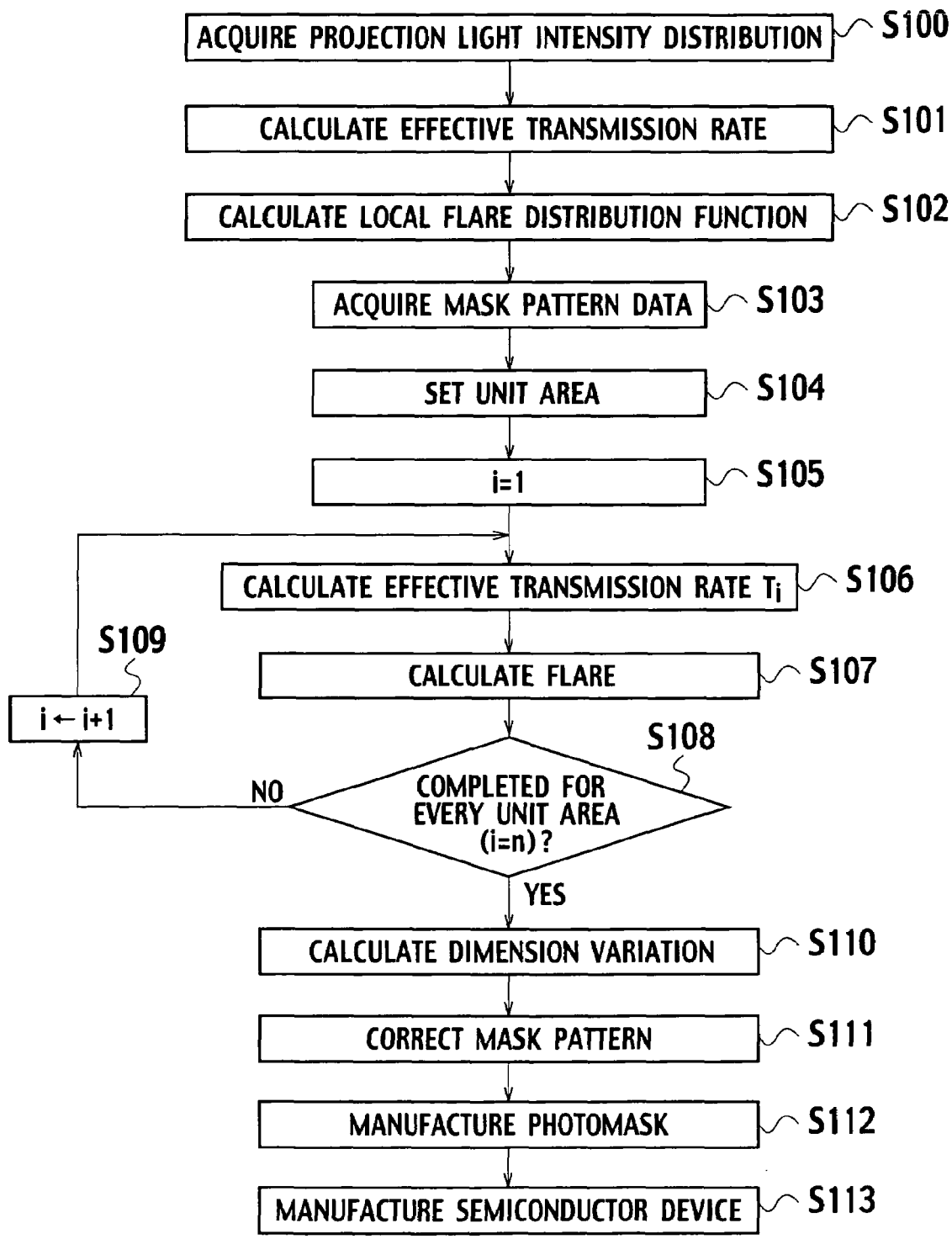
FIG. 17 is a flowchart showing an example of a correction method for a mask pattern and a manufacturing method for a semiconductor device according to the first embodiment of the present invention.

Next, descriptions will be provided for a manufacturing method for a semiconductor device using a correction method for a mask pattern according to the first embodiment with reference to a flowchart shown in FIG. 17. Here, the monitor mask pattern data of the inspection photomask 1a shown in FIG. 6 is stored in the design information database 34. The illumination conditions, such as the illumination light intensity, of the exposure tool provided in the manufacturing tool 40 shown in FIG. 2, are stored in the manufacturing information database 38. Additionally, the measured data of the local flare of the exposure tool measured by use of the inspection photomask 1a, which is the projection light intensity distribution, is stored in the manufacturing information database 38 or the inspection information database 42.

In step S100, the flare information input module 12 in the correction unit 11 acquires the projection light intensity distribution from the manufacturing information database 38 or the inspection information database 42. In addition, the flare information input module 12 acquires the monitor mask pattern data of the inspection photomask 1a from the design information database 34, and acquires the illumination light intensity of the exposure tool from the manufacturing information database 38.

In step S101, the transmission rate calculation module 14 calculates, as a first effective transmission rate, a first ratio between the illumination light intensity and the projection light intensity to the semiconductor substrate 10, based on the monitor mask pattern data.

In step S102, the distribution function calculation module 16 calculates a distribution function of the local flare caused by the dependence on the mask pattern coverage in the monitor mask pattern 53 of the inspection photomask 1a, based on the projection light intensity distribution and the first effective transmission rate.

In step S103, the design information input module 18 acquires the mask pattern data of the design mask pattern of the target photomask 1.

In step S104, the area setting module 20 divides the design mask pattern into a plurality of unit areas. In step S105, subsequently, one of the unit areas is selected.

In step S106, the flare calculation module 22 calculates, as a second effective transmission rate, a second ratio between the illumination light intensity and the projection light intensity to the semiconductor substrate 10 calculated in each of the unit areas based on the design mask pattern. In step S107, the flare calculation module 22 calculates the local flare intensity in each of the unit areas based on the distribution function and the second effective transmission rate. The procedures implemented in steps S106 and S107 are repeated until the calculation of the local flare intensity is completed for all of the unit areas. Thus, the distribution intensity of the local flare is obtained.

In step S110, the pattern correction module 24 calculates a dimensional variation in a transferred resist pattern of the design mask pattern based on the intensity distribution of the local flare. In step S111, the pattern correction module 24 corrects the design mask pattern by use of the calculated dimensional variation in the resist pattern. Thus, the corrected mask pattern data is generated.

The data output module 26 stores the corrected mask pattern data in the design information database 34. In step S112, the designing tool 36 fabricates the target photomask 1 based on the corrected mask pattern data.

In step S113, the target photomask 1 and the semiconductor substrate 10, coated with a resist film, is loaded to the exposure tool. The corrected mask pattern of the target photomask 1 is transferred onto the resist film, to form a resist pattern. Subsequently, the semiconductor substrate 10 is processed using the resist pattern as a mask. Thus, the semiconductor device is manufactured.

In the case of the first embodiment, dependence of a dimensional variation on the mask pattern coverage in the resist pattern caused by a local flare is corrected with regard to the design mask pattern of the target photomask 1. The circuit pattern of the semiconductor device to be processed by transferring the corrected mask pattern may become a desired shape for the desired design pattern faithfully.

SECOND EMBODIMENT

Figure 18:
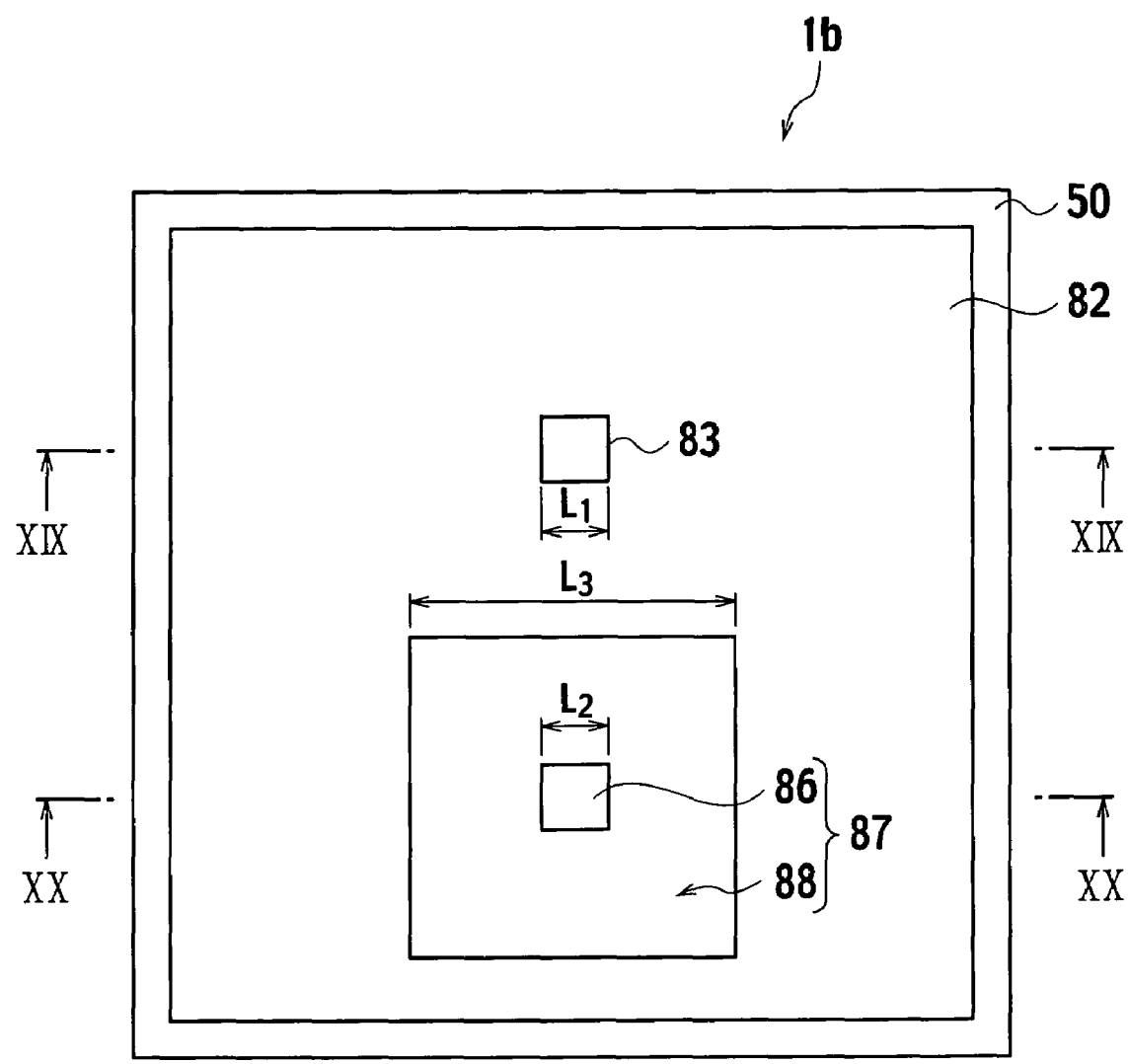
FIG. 18 is a plan view showing an example of an inspection photomask according to a second embodiment of the present invention.

In an inspection photomask 1b used for an evaluation method of a local flare according to a second embodiment of the present invention, a first mask pattern 83 and a second mask pattern 87 are arranged in an opaque film 82, such as chromium (Cr), which is deposited on the surface of the mask substrate 50, such as fused silica, as shown in FIG. 18. For example, the first mask pattern 83 is a square with a length $L_1$ of about three mm on a side. In addition, the second mask pattern 87 includes an opaque portion 86 and an opening portion 88 surrounding the opaque portion 86. The opaque portion 86 is a square with a length $L_2$ of about three mm on a side. The opening portion 88 is a square with a length $L_3$ of about 15 mm on a side. The opaque portion 86 is positioned in the center region of the opening portion 88. Furthermore, a width of the opaque film 82 between the first mask pattern 83 and the opening portion 88 is about two mm or more, for example, about eight mm. Although omitted from the illustration, an alignment mark used for positioning on the mask stage 8 in the exposure tool shown in FIG. 1 is provided in the inspection photomask 1b. Using the alignment mark, the first mask pattern 83 and the opaque portion 86 can be projected to overlay with each other onto the semiconductor substrate 10 on the substrate stage 9 by a double exposure technique.

Figure 19:
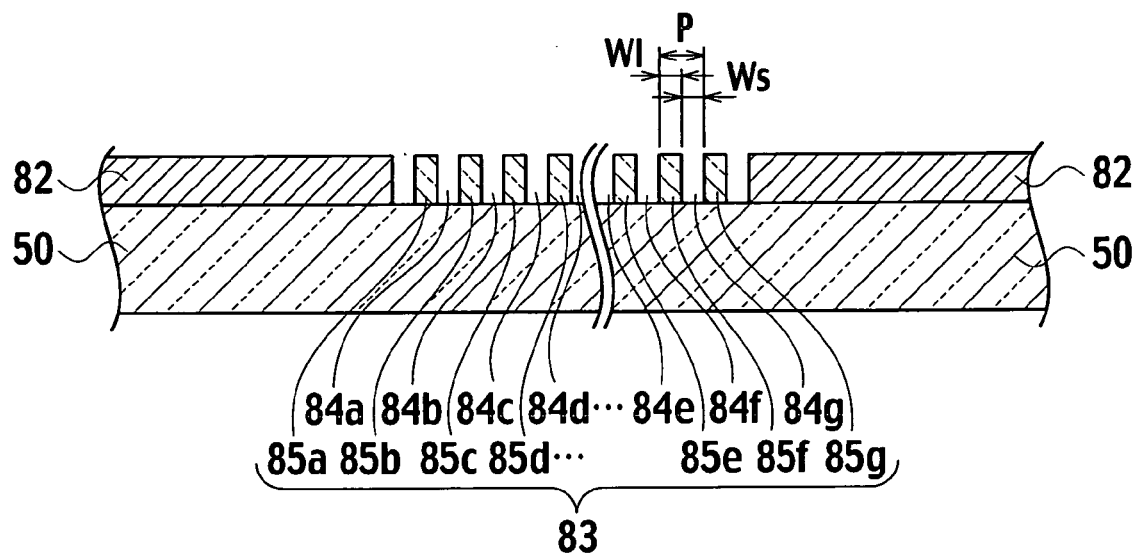
FIG. 19 is a cross sectional view of the inspection photomask taken along line XIX-XIX in FIG. 18.
Figure 20:
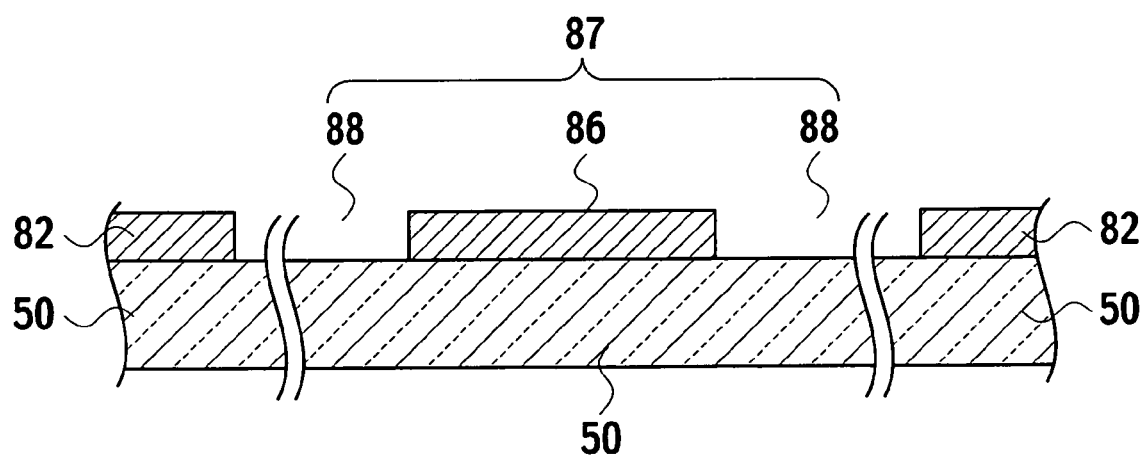
FIG. 20 is a cross sectional view of the inspection photomask taken along line XX-XX in FIG. 18.

The first mask pattern 83 in the inspection photomask 1b includes a plurality of semitransparent films 85a, 85b, 85c, 85d, . . . , 85e, 85f, 85g in the opaque film 82, as shown in FIG. 19. The plurality of semitransparent films 85a, 85b, 85c, 85d, . . . , 85e, 85f, 85g are periodically arranged to be sandwiched with each of a plurality of opening portions 84a, 84b, 84c, 84d, . . . 84e, 84f, 84g. A periodic pattern of the first mask pattern 83 is an L/S pattern where a ratio of the line width Wl of each of the semitransparent films 85a, 85b, 85c, 85d, . . . , 85e, 85f, 85g to the space width Ws of each of the opening portions 84a, 84b, 84c, 84d, . . . , 84e, 84f, 84g is one to one. A period P of the L/S pattern is about 200 nm. A half-tone phase shift film, such as molybdenum silicide ($MoSi_2$), is used for the semitransparent films 85a, 85b, 85c, 85d, . . . , 85e, 85f and 85g. The $MoSi_2$ film is formed so as to have a transmission rate of, for example, about six percent to an exposure light, and to yield a phase difference of about 180°.

The second mask pattern 87 includes the opaque portion 86 in the opening portion 88 provided in the opaque film 82. The opaque portion 86 is Cr or the like, in common with the opaque film 82. In the opening portion 88, the surface of the mask substrate 50 is exposed by partially removing the opaque film 82. In the opening portion 88, it is allowable not to entirely remove the opaque film 82 on the mask substrate 50. For example, a pattern in which transparent areas and opaque areas may be periodically arranged in the opening portion to have a predetermined transmission rate.

Figure 21:
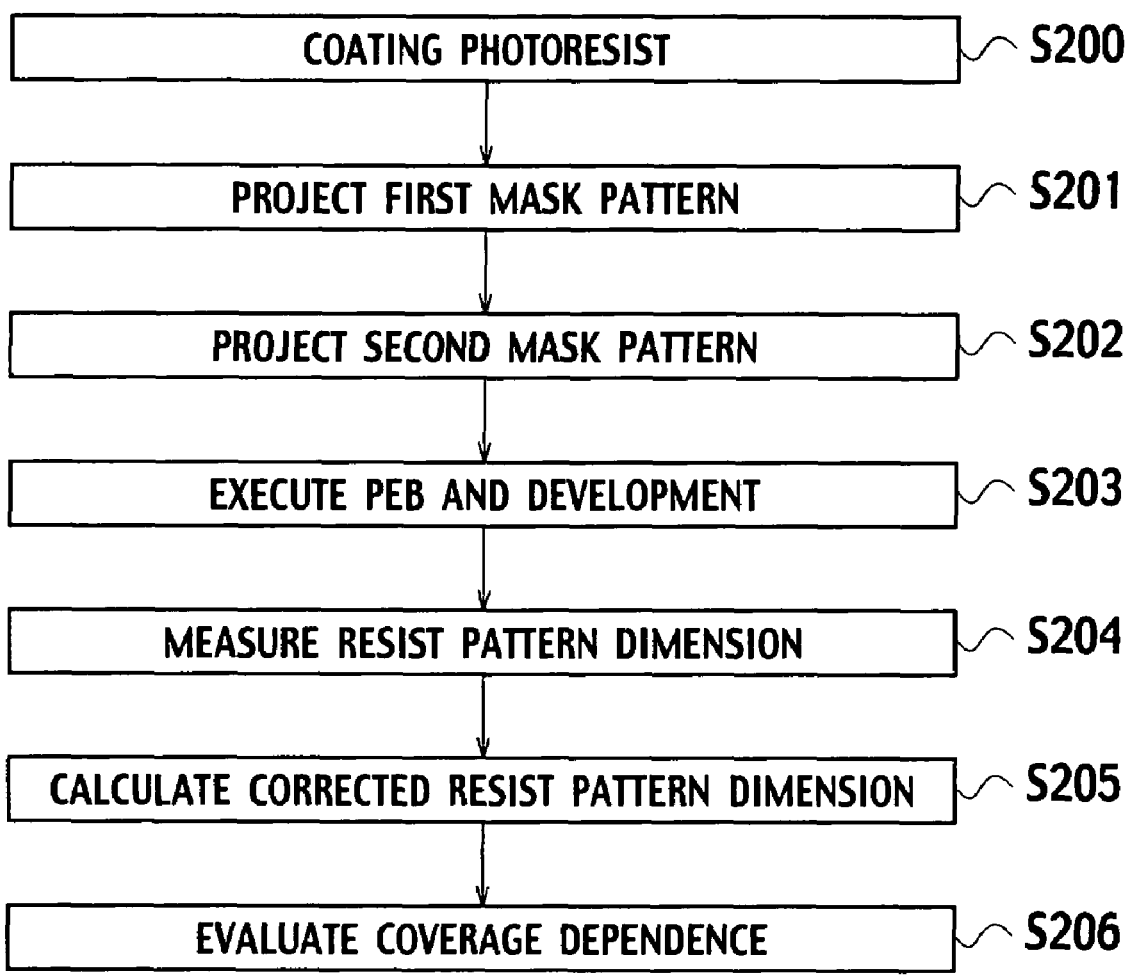
FIG. 21 is a flowchart showing an example of an evaluation method for a local flare according to the second embodiment of the present invention.
Figure 22:
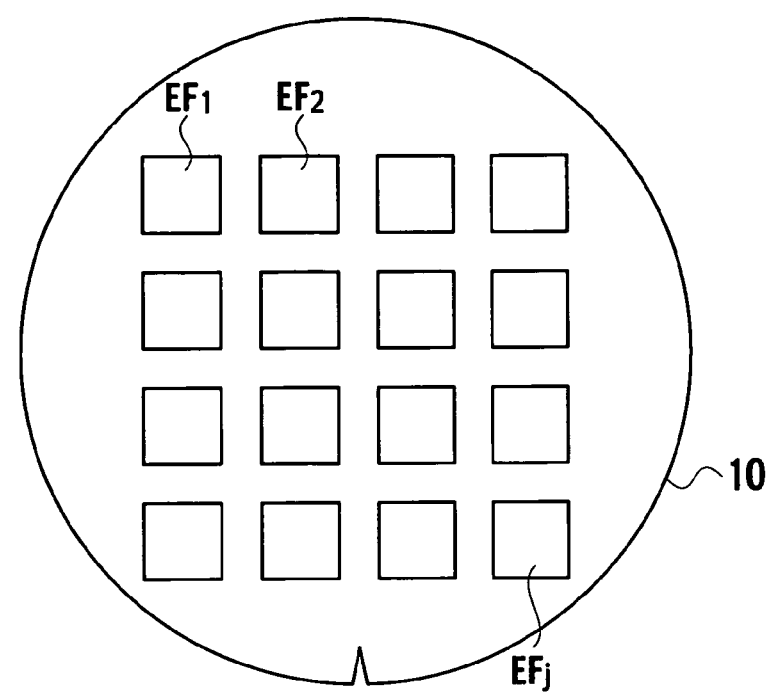
FIG. 22 is a diagram showing an example of exposure fields of the inspection photomask on the semiconductor substrate according to the second embodiment of the present invention.

Next, descriptions will be provided for an evaluation method according to a second embodiment with reference to a flowchart shown in FIG. 21. The exposure tool shown in FIG. 1 is used to transfer the first mask pattern 83 and the second mask pattern 87 in the inspection photomask 1b. The first mask pattern 83 and the second mask pattern 87 are transferred onto a plurality of exposure fields $EF_1$, $EF_2$, ..., $EF_j$ on the semiconductor substrate 10, as show in FIG. 22. Although a positive resist film is used in the description, a negative resist film may be used.

In step S200, the surface of the semiconductor substrate 10 is coated with the positive resist film. The inspection photomask 1b and the semiconductor substrate 10 coated with the resist film are loaded to the substrate stage 9 of the exposure tool.

In step S201 for a first exposure process, the first mask pattern 83 in the inspection photomask 1b is projected onto the respective exposure fields $EF_1$, $EF_2$, ..., $EF_j$ in the resist film. In the first exposure process, a first exposure dose $ED_1$ which enables a L/S pattern in the first mask pattern 83 to transfer with a predetermined dimension is selected.

In step S202 for a second exposure process, the second mask pattern 87 is projected onto the respective exposure fields $EF_1$, $EF_2$, ..., $EF_j$ in the resist film, so as to overlay the opaque portion 86 onto a region where the first mask pattern 83 has been projected. In the second exposure process, second exposure doses $ED_2$ which are changed from 0 to the first exposure dose $ED_1$, are used in the respective exposure fields $EF_1$, $EF_2$, ..., $EF_j$.

Figure 23:
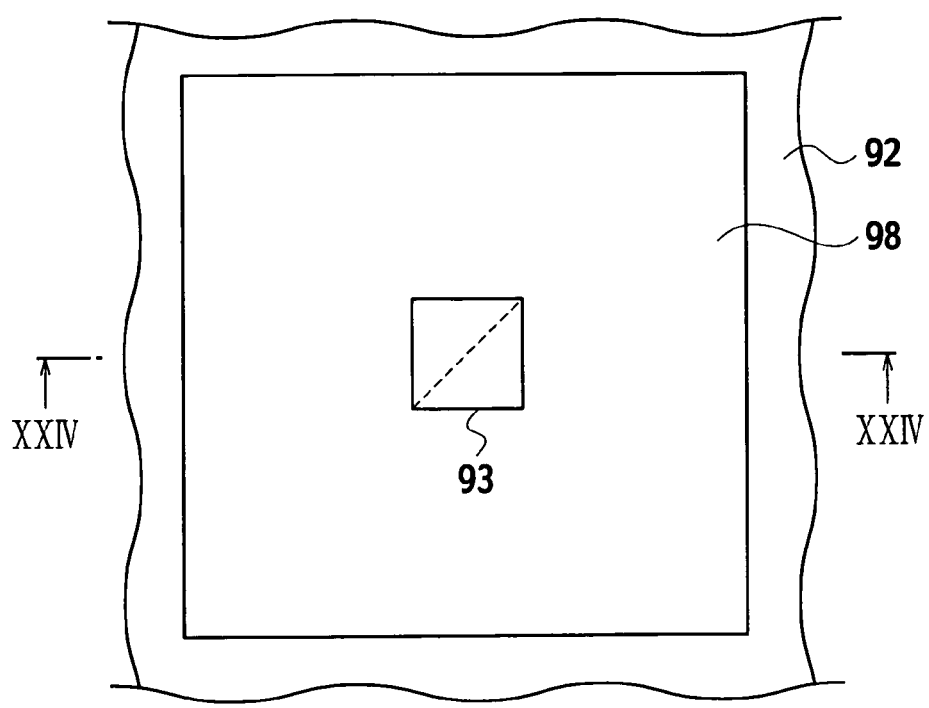
FIG. 23 is a plan view showing an example of a transferred resist pattern on a semiconductor substrate from the inspection photomask according to the second embodiment of the present invention.
Figure 24:
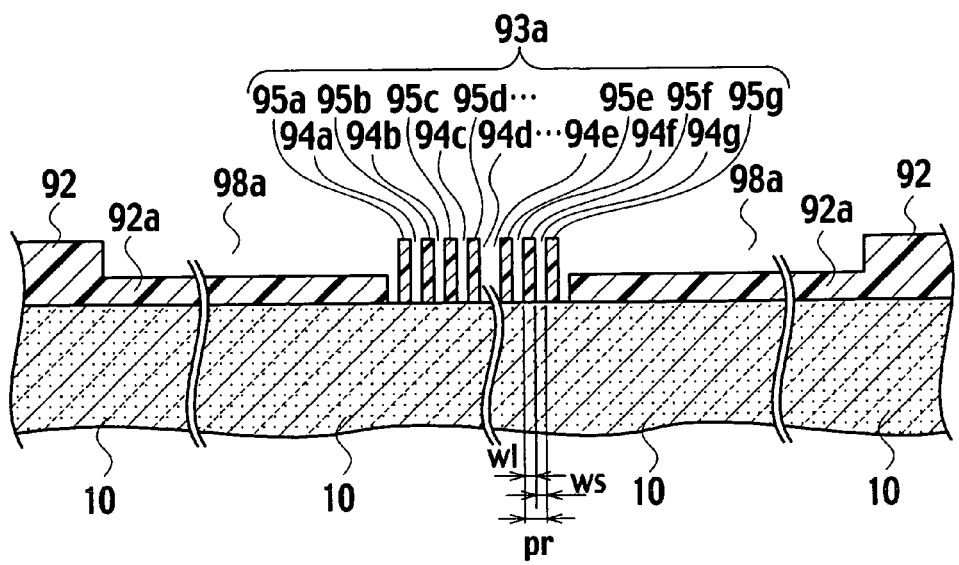
FIG. 24 is a cross sectional view showing an example of the transferred resist pattern taken along line XXIV-XXIV in FIG. 23.
Figure 25:
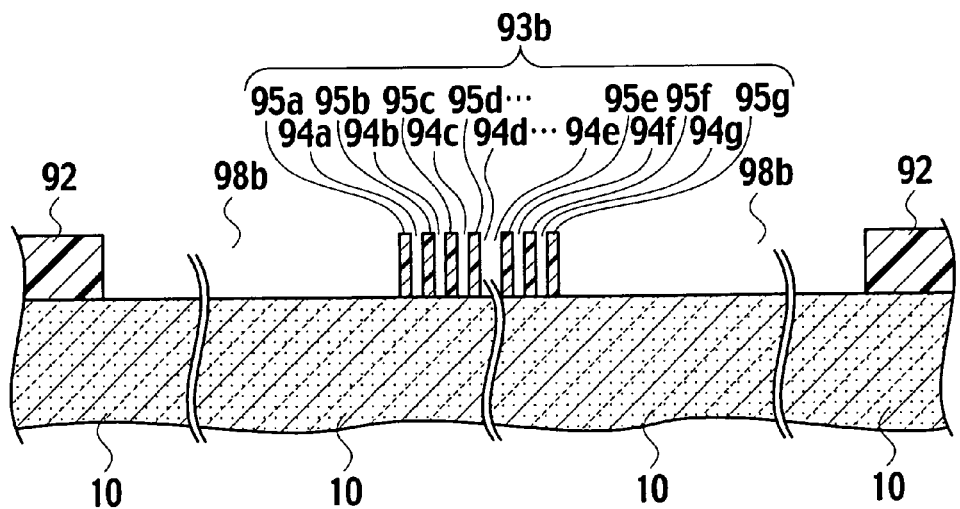
FIG. 25 is a cross sectional view showing another example of the transferred resist pattern taken along line XXIV-XXIV in FIG. 23.

In step S203, the semiconductor substrate 10 is subjected to a PEB process and a development process, to transfer the first mask pattern 83 and the second mask pattern 87 onto the resist film 92. Thus, a resist pattern 93 and a resist opening portion 98 are formed in the respective exposure fields $EF_1$, $EF_2$, ..., $EF_j$, as shown in FIG. 23. In the exposure fields $EF_1$, $EF_2$, $EF_j$, an exposure field transferred by an exposure dose EDa, as the second exposure dose $ED_2$, which is smaller than a critical exposure dose for completely dissolving the resist film 92, is formed with a resist film 92a remaining in the resist opening portion 98a, as shown in FIG. 24. Another exposure field transferred by an exposure dose Edb, as the second exposure dose $ED_2$, which is equal to or larger than the critical exposure dose, is formed with the resist opening portion 98b in which the resist film 92 is completely dissolved, as shown in FIG. 25. In both of resist patterns 93a and 93b, as shown in FIGS. 24 and 25, L/S resist patterns including a plurality of resist opening portions 94a, 94b, 94c, 94d, ..., 94e, 94f, 94g with a space width ws, and a plurality of resist images 95a, 95b, 95c, 95d, ..., 95e, 95f, 95g with a line width wl, which are transferred from the first mask pattern 83 by the first exposure dose $ED_1$, are formed with a period pr.

In step S204, a line width wl of each of the resist images 95a, 95b, 95c, 95d, ..., 95e, 95f, 95g is measured along a diagonal line of the resist pattern 93, for example, which is indicated by a dashed line shown in FIG. 23, in each of the exposed areas $EF_1$, $EF_2$, ..., $EF_j$. The measurement of the line width is not limited to the diagonal line of the resist pattern 93. The line width may be measured along an arbitrary line from one end to another end of the resist pattern 93.

In step S205, a dimensional variation in the line width wl of each of the resist images 95a, 95b, 95c, 95d, ..., 95e, 95f, 95g, which is caused by the dimension error of the measured line width Wl of each of the semitransparent films 85a, 85b, 85c, 85d, ..., 85e, 85f, 85g of the first mask pattern 83 varied from the design value, is corrected. A corrected line width is calculated by subtracting a value obtained by multiplying the mask dimensional variation by a mask error factor MEF, from the measured line width wl of the resist images 95a, 95b, 95c, 95d, ..., 95e, 95f, 95g. The mask error factor MEF is a coefficient used for converting the mask dimensional variation into a dimensional variation on a target substrate onto which the mask pattern is transferred. The mask error factor MEF is obtained by a calculation based on the illumination conditions of the exposure tool and a dimension of a transferred resist pattern. If the dimension error of the mask pattern is small enough for a difference between the corrected line width and the measured line width to be within an error tolerance in manufacturing of the semiconductor device, the calculation for the correction in step S205 may be omitted.

Figure 26:
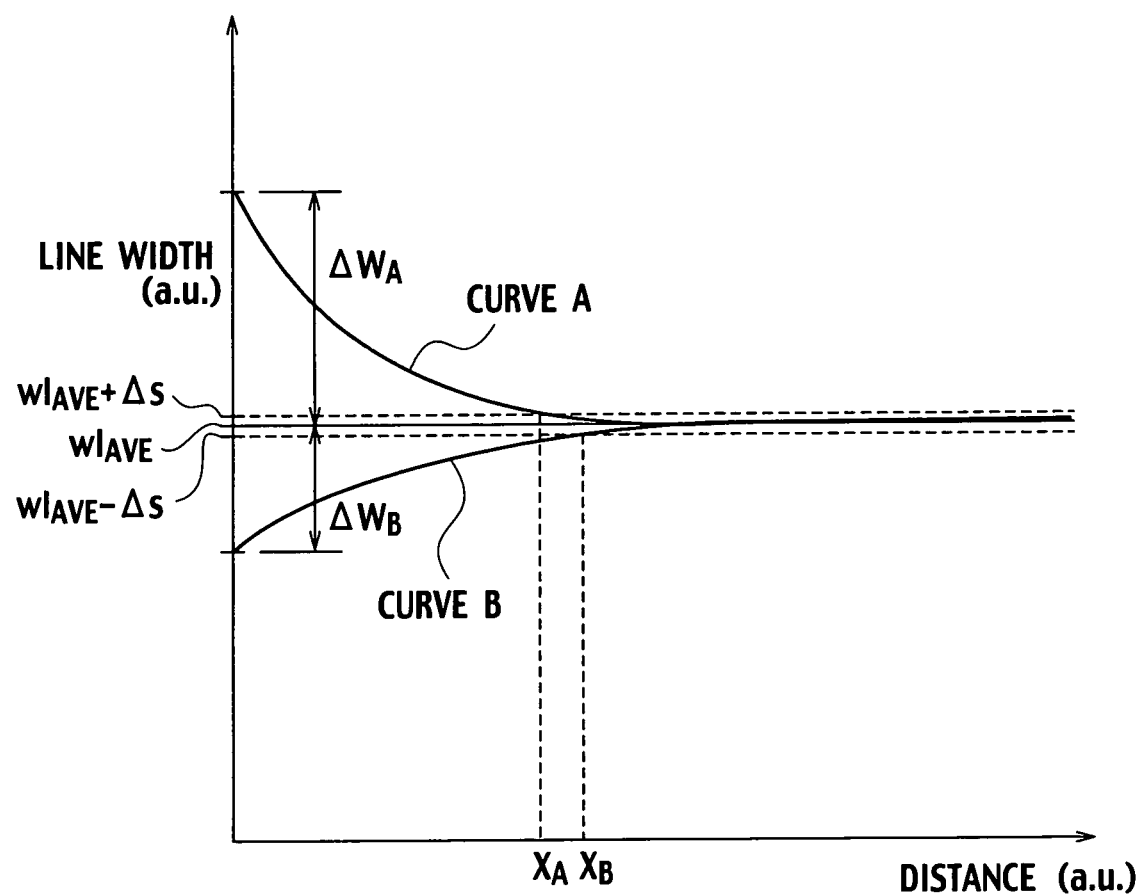
FIG. 26 is a diagram showing an example of characteristic amounts of dimensional variations in the resist pattern according to the second embodiment of the present invention.

In step S206, an average line width $wl_{AVE}$ and a line width variation $\Delta s$, for example, in a center area of the resist pattern 93 having a square with about 1 mm on a side, are calculated for each of the exposed areas $EF_1$ to $EF_j$. As shown in FIG. 26, for example, each of corrected line widths in the resist patterns 93a, 93b is plotted in relation to a distance from an end of the resist pattern 93a, 93b, so as to evaluate maximum variations $DW_A$ and $DW_B$ as well as variation distances $X_A$ and $X_B$, respectively, as characteristic amounts of dimensional variation in the resist pattern. The maximum variations $\Delta W_A$, $\Delta W_B$ are defined as maximum values of line width variation in the end portions of the resist patterns 93a, 93b, respectively, from the average line width $wl_{AVE}$. The variation distances $X_A$, $X_B$ are defined as distances from the end portions of the resist patterns 93a, 93b respectively, to a variation tolerance ($wl_{AVE} \pm \Delta s$) of the line widths. The variation $\Delta s$ is determined based on the dimension error tolerance of the semiconductor device. Distribution curves "A" and "B" of the line widths shown in FIG. 26 represent variations in line widths of the resist images 95a to 95g in the exposure fields shown in FIGS. 24 and 25, respectively.

In the distribution curves A and B, since the exposure doses in the resist opening portion 98a, 98b in the periphery of the resist patterns 93a, 93b are different from each other, the effective exposure conditions, which are equivalent to the exposure conditions with the different mask pattern coverages in the opening portion 88 in the inspection photomask 1b shown in FIG. 18, is created. It has been known that the dimensional variations as shown in the distribution curves A and B occurs from evaporation and re-deposition of an acid in a resist film during a PEB process, a development microloading effect due to change in concentration of a developing solution during a development process, a local flare of an exposure tool, and the like. Moreover, an amount of evaporation of the acid and a magnitude of the development microloading effect also change depending on a composition of a photo resist, process conditions for a PEB process and a development process, and the like.

For example, under a condition where the mask pattern coverage in the periphery of the resist pattern 93a is large, the amount of the acid evaporated from the periphery of the resist pattern 93a during the PEB process is small. As a result, a development rate is reduced, and accordingly the line width in the end portion of the resist pattern 93a increases, as shown in the distribution curve A. On the other hand, under a condition where the mask pattern coverage in the periphery of the resist pattern 93b is small, the amount of the acid evaporated from the periphery of the resist pattern 93b during the PEB process is large. As a result, the development rate is increased, and accordingly the line width in the end portion of the resist pattern 93b decreases, as shown in the distribution curve B. Consequently, the characteristic amount of the dimensional variation in the resist pattern, such as the maximum variations $\Delta W_A$, $\Delta W_B$, and the variation distances $X_A$, $X_B$, represents a dimensional variation depending on the mask pattern coverage. The smaller the dependence on the mask pattern coverage, the smaller the dimensional variation in the resist in the exposure field. It is desirable to use a photo resist and a process condition for the photolithography process, both of which have small dependence on the mask pattern coverage, in the manufacturing processes of a fine pattern semiconductor device. In the case of the evaluation method of a local flare according to the second embodiment, it is possible to select a photo resist, and process conditions, such as the PEB process and the development process, which decrease the dimensional variation in the exposure field.

Figure 27:
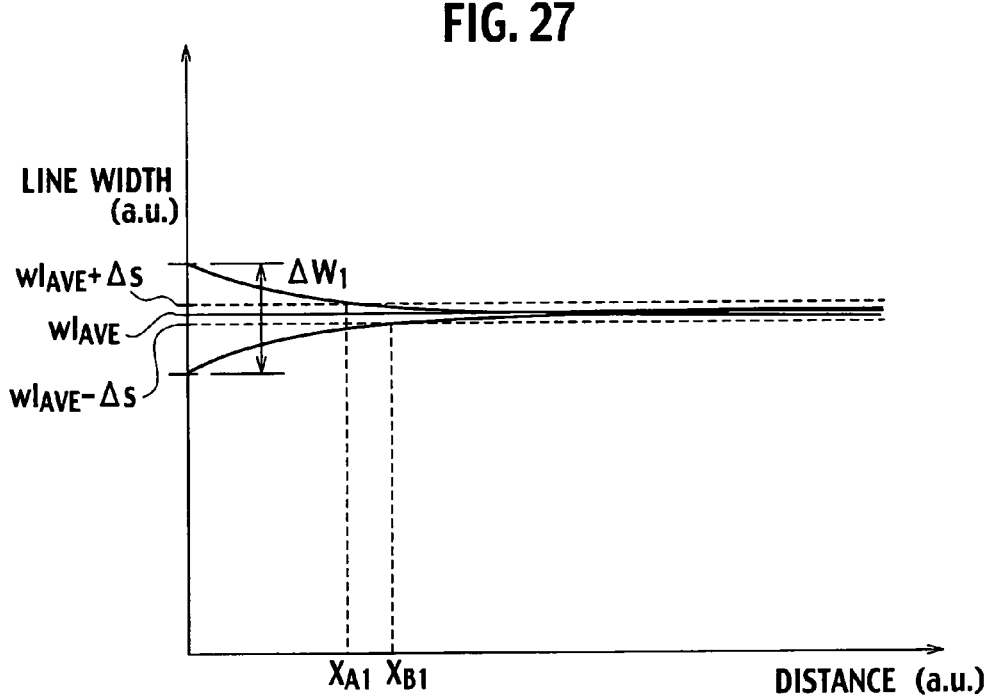
FIG. 27 is a diagram showing another example of characteristic amounts of dimensional variations in the resist pattern according to the second embodiment of the present invention.
Figure 28:
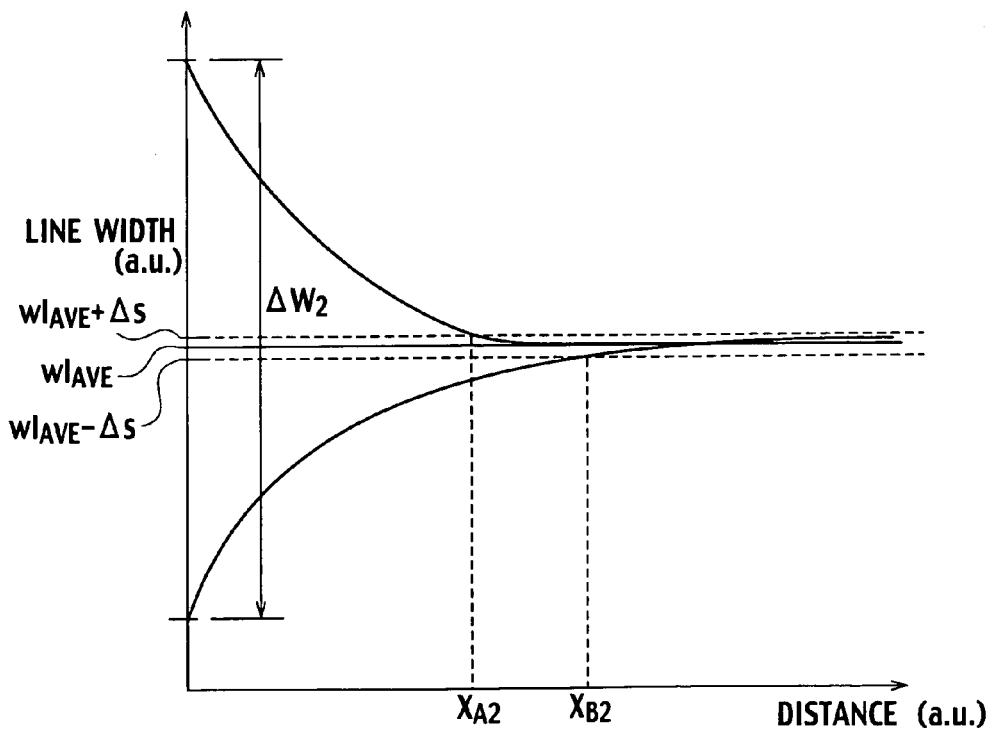
FIG. 28 is a diagram showing still another example of characteristic amounts of dimensional variations in the resist pattern according to the second embodiment of the present invention.

For example, by use of the evaluation method of a local flare according to the second embodiment, dependence of line widths of the resist pattern 93 on the mask pattern coverage is measured for each of photo resists A and B of different lots. With regard to resist images 95a to 95g which are provided by coating the photo resist A and transferring the mask pattern, the characteristic amounts of dimensional variation in the resist pattern, including a variation range $\Delta W_1$ of the maximum variations and variation distances $X_{A1}$ and $X_{B1}$, are obtained, as shown in FIG. 27. With regard to resist images 95a to 95g which are provided by coating the photo resist B and transferring the mask pattern, the characteristic amounts of dimensional variation in the resist pattern, such as a variation range $\Delta W_2$ of the maximum variations and variation distances $X_{A2}$ and $X_{B2}$, is obtained, as shown in FIG. 28. All of the characteristic amounts of the dimensional variation in the resist pattern of the photo resist A are smaller than the photo resist B. As a result, the dependence on the mask pattern coverage is smaller in the photo resist A than the photo resist B. Thus, it is possible to decrease the amount of the dimensional variation.

In other words, it can be determined that, from the viewpoint of manufacturing the semiconductor device, the photo resist A having less dependence on the mask pattern coverage is more desirable than the photo resist B, in order to prevent the dimensional variation in the transferred pattern. In addition, in the case of the evaluation method of a local flare according to the second embodiment, the dimensional variation in the first mask pattern 83 is corrected. Therefore, it is possible to evaluate a local flare without influence of the dimensional variation caused by the dependence of the mask pattern on the mask pattern coverage in the manufacturing of the photomask. A target mask pattern for correcting a dimensional variation is only the first mask pattern 83. Thus, it is possible to easily evaluate the dependence on the mask pattern coverage for a shorter time.

Furthermore, by applying the evaluation method of a local flare according to the second embodiment to a plurality of different exposure tools after selecting a photoresist and process conditions for photolithography, it is possible to classify the exposure tools according to a magnitude relation of dependence on the mask pattern coverage. Since the photoresist and the process conditions for photolithography are common among the plurality of exposure tools, the dependence on the mask pattern coverage caused by a local flare can be evaluated for each of the exposure tools. Even in a case of the exposure tool which causes a larger local flare, the dimensional variation caused by the local flare can be decreased, for example, by using the evaluation method according to the first embodiment. The local flare reduces an exposure latitude. Thus, it is desirable to use an exposure tool which causes a smaller local flare, due to a smaller dimensional variation caused by a variation in an exposure dose. For example, in a manufacturing process required to form a circuit pattern with a precise and even dimension, by using the exposure tool which causes a smaller dependence on the mask pattern coverage, the yield rate for manufacturing a semiconductor device can be increased.

Figure 29:
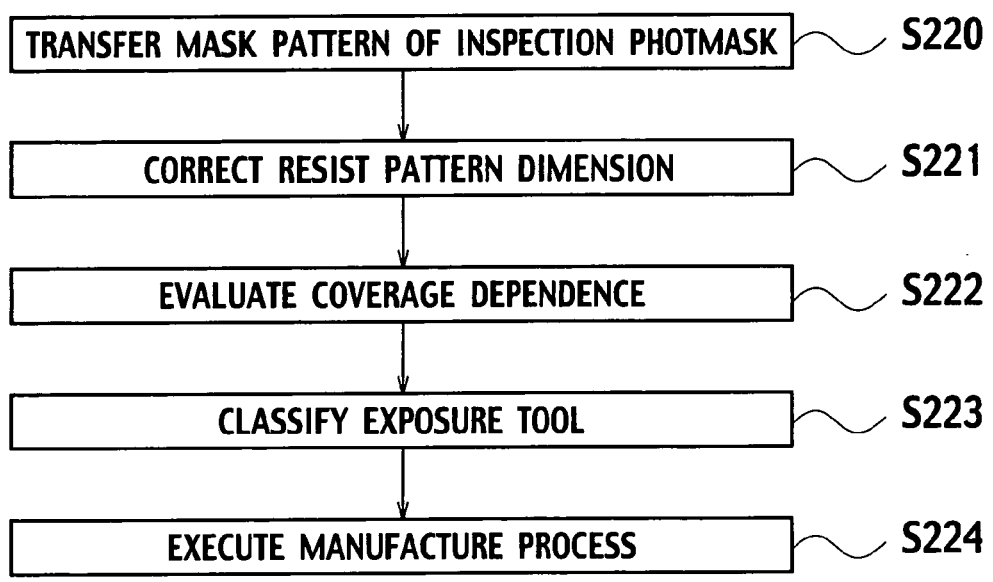
FIG. 29 is a flowchart showing an example of a manufacturing method for a semiconductor device according to the second embodiment of the present invention.

Descriptions will be provided for a method for manufacturing a semiconductor device, using a plurality of exposure tools which are classified by the evaluation method of a local flare according to the second embodiment, with reference to a flowchart shown in FIG. 29.

The inspection photomask 1b shown in FIG. 18 is loaded to each of a plurality of inspection target exposure tools to be used in manufacturing processes of a semiconductor device. In step S220, the first and second mask pattern 83, 87 of the inspection photomask 1b are transferred onto the resist film coated on the semiconductor substrate 10 for inspection, by use of each of the inspection target exposure tools.

In step S221, the line widths of the resist images 95a to 95g in the resist pattern transferred on the semiconductor device 10 are measured as resist pattern dimensions. The measured resist pattern dimensions of the resist images 95a to 95g, transferred using each of the inspection target exposure tools, are corrected with respect to the dimensional variation caused by the mask dimension error from the design dimension values of the mask pattern.

In step S222, based on each of the corrected resist pattern dimensions, the characteristic amounts of the dimensional variation in the resist pattern, such as the maximum variations $\Delta DW_A$ and $\Delta W_B$ of the line widths, the variation distances $X_A$ and $X_B$, are calculated, to evaluate the dependence on the mask pattern coverage.

In step S223, based on the calculated characteristic amounts of the dimensional variation in the resist pattern, each of the inspection target exposure tools is classified.

In step S224, by selecting a usable exposure tool for each manufacturing process of a semiconductor device, the photolithography process of the semiconductor device is executed. For example, from among the classified exposure tools, an exposure tool classified to a level in which dependence on the mask pattern coverage is smaller than the error tolerance of the pattern dimension formed by the manufacturing process, is selected.

In the exposure tools used for manufacturing a semiconductor device having a fine pattern, even though the dimension accuracy defined in the specifications is the same, the actual dimension accuracy varies by individual differences between the exposure tools due to manufacturing errors of the exposure tools. Performance of a semiconductor device may vary due to the dependence on the mask pattern coverage which is specific to each of the exposure tools used in the photolithography process. In the second embodiment, the dependence on the mask pattern coverage specific to each of the exposure tools is evaluated, so as to classify the exposure tools in accordance with the characteristic amounts of the dimensional variation in the resist pattern. Accordingly, it is possible to select an exposure tool which can achieve dimensional accuracy that is less than the dimension error tolerance required for the manufacturing process of a semiconductor device, and to execute the photolithography process. Thus, it is possible to manufacture a semiconductor device to prevent performance variation.

Figure 30:
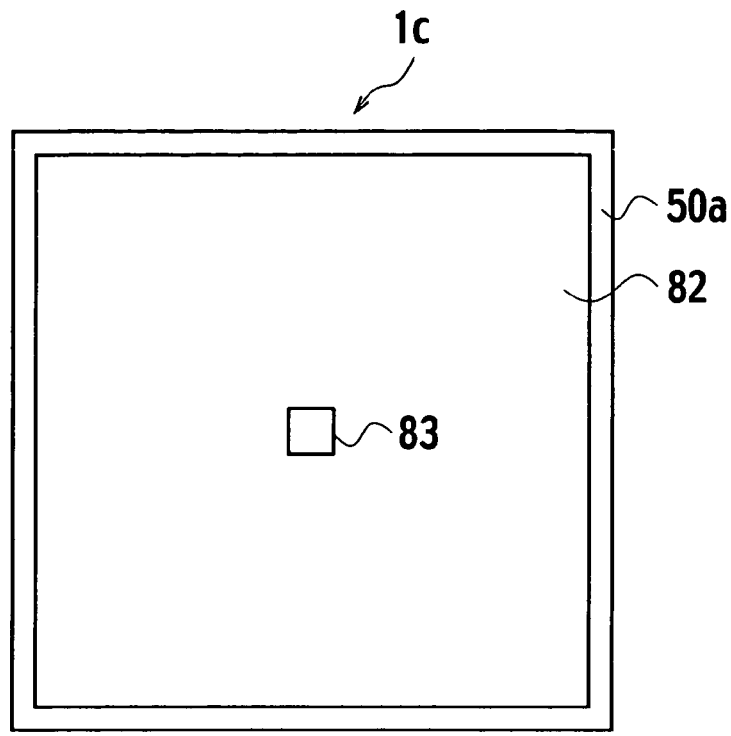
FIG. 30 is a plan view showing another example of an inspection photomask according to a second embodiment of the present invention.
Figure 31:
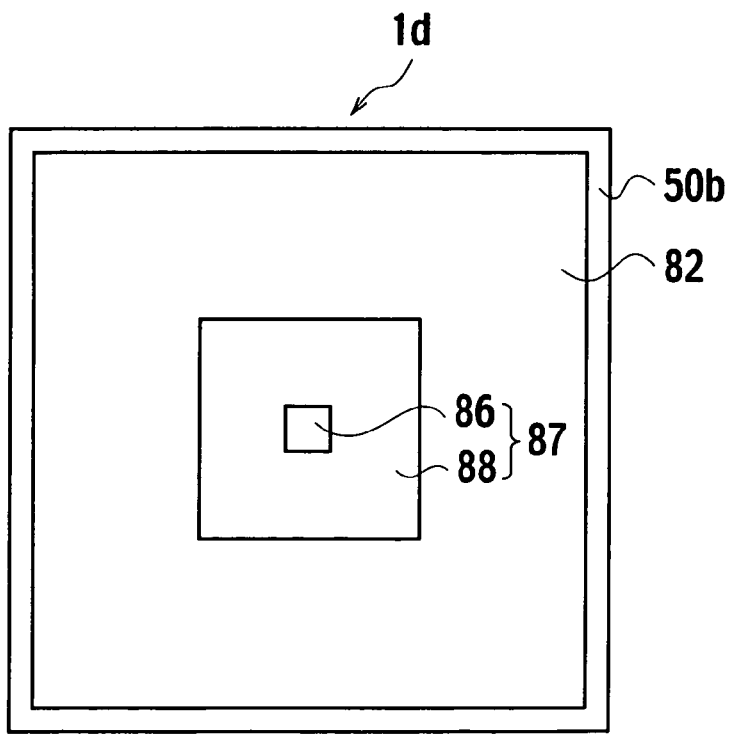
FIG. 31 is a plan view showing still another example of an inspection photomask according to a second embodiment of the present invention.

The second embodiment has been described using the first and second mask patterns 83, 87 formed in the inspection photomask 1b as shown in FIG. 18. However, the first mask pattern 83 and the second mask pattern 87 may not be formed in the same mask substrate 50. For example, as shown in FIGS. 30 and 31, an inspection photomask 1c and an inspection photomask 1d may be used. In the inspection photomask 1c, the first mask pattern 83 is formed on a mask substrate 50a. In the inspection photomask 1d, the second mask pattern 87 is formed on a mask substrate 50b.

OTHER EMBODIMENT

The first and the second embodiments of the present invention have been described using the ArF excimer laser as the light source 2 of the exposure tool. However, a fluoride (F2) excimer laser with a wavelength λ of 157 nm, a krypton fluoride (KrF) excimer laser with a wavelength λ of 248 nm, and the like, may be used as the light source 2. In addition, the light source 2 is not limited to the excimer lasers. An ultraviolet light, such as I-line with a wavelength λ of 365 nm, an extreme ultraviolet (EUV) light with a wavelength λ of about 10 nm to about 20 nm, an electron beam, and the like, may be also used as the light source 2.

Figure 32:
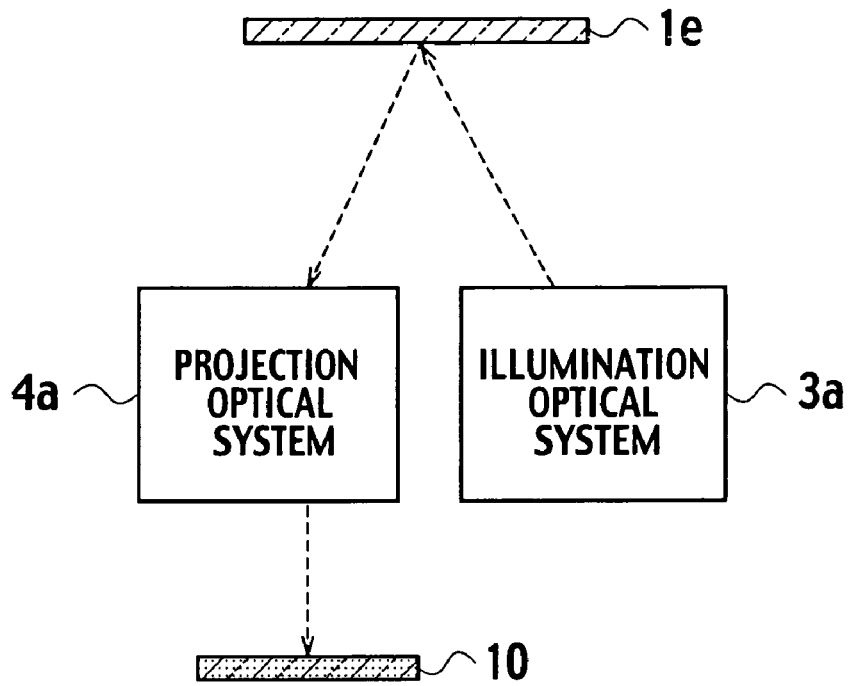
FIG. 32 is a schematic block diagram of an exposure tool according to other embodiments of the present invention.

In addition, in a case where the exposure is executed by an EUV light with a wavelength of about 10 nm to about 20 nm, the photomask, the lenses of the optical systems, and the like, are the reflection type, since no solid material is transparent to the EUV light. As shown in FIG. 32, a reflection type exposure tool includes an illumination optical system 3a and a projection optical system 4a. The illumination optical system 3a and the projection optical system 4a include reflection type lenses, mirrors, and the like. A photomask 1e is placed so as to face an exit side of the illumination optical system 3a, and an entrance side of the projection optical system 4a. A semiconductor substrate 10 is placed in an exit side of the projection optical system 4a. An optical path in the exposure tool is provided in a vacuum. The EUV light radiated from the illumination optical system 3a is reflected by the photomask 1e, to project onto the semiconductor substrate 10 through the projection optical system 4a.

Figure 33:
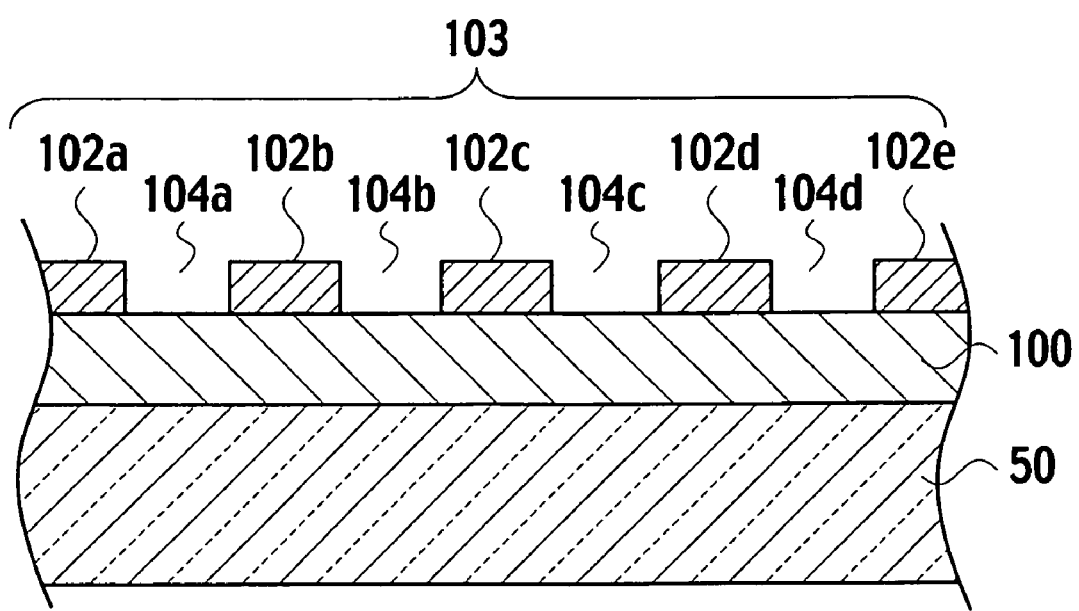
FIG. 33 is a cross sectional view showing an example of a photomask according to other embodiments of the present invention.

In the photomsk 1e used in the reflection type exposure tool, a mask pattern 103 is formed above a mask substrate 50. In the mask pattern 103, opaque films 102a, 102b, 102c, 102d, 102e and opening portions 104a, 104b, 104c, 104d respectively exposing a surface of a reflection film 100 on the mask substrate 50 are arranged alternately, as shown in FIG. 33. The opaque films 102a to 102e are absorber material for the EUV light, such as Cr, and tantalum nitride (TaN). The reflection film 100 is a multi-layered film having, for example, Mo and Si laminated alternately. The mask substrate 50 is a low thermal expansion glass, a Si semiconductor substrate, or the like. The "low thermal expansion glass" refers to a glass in which a thermal expansion coefficient is equal to, or less than $1 \times 10^{-7}$ $K^{-1}$ when measured at a temperature of 293 K (20° C.). The low thermal expansion glass includes, such as a titanium silicate glass.

Various modifications will become possible for those skilled in the art after storing the teachings of the present disclosure without departing from the scope thereof.

What is claimed is:

1. A method for evaluating a local flare in an exposure tool, comprising:
   measuring a projection light intensity distribution on a semiconductor substrate by transferring a monitor mask pattern of an inspection photomask onto the semiconductor substrate, the monitor mask pattern being a window pattern surrounded by an opaque film;
   calculating a first ratio between an illumination light intensity at the monitor mask pattern and a first projection light intensity on the semiconductor substrate, the first projection light intensity calculated based on the monitor mask pattern;
   calculating a distribution function of a local flare, due to a mask pattern coverage of the monitor mask pattern, based on the first ratio and the projection light intensity distribution;
   dividing a design mask pattern of a target photomask into a plurality of unit areas;
   calculating a second ratio between the illumination light intensity on each of the unit areas and a second projection light intensity on the semiconductor substrate, the second projection light intensity calculated based on the design mask pattern; and
   calculating a local flare intensity in each of the unit areas, based on the second ratio and the distribution function.

2. The method of claim 1, wherein the distribution function is expressed by a first constant representing a fraction of a local flare component in the first projection light intensity and a second constant representing a spreading distance of the local flare.

3. The method of claim 1, wherein the projection light intensity distribution is calculated from a thickness distribution of the resist film in a surrounding area of a transferred monitor resist pattern of the monitor mask pattern.

4. The method of claim 1, wherein the monitor mask pattern is a line and space pattern with a width ratio of a line to space of about 1:1.

5. The method of claim 1, wherein the first and second projection light intensities are calculated with illumination conditions of the exposure tool used in a manufacturing process of a semiconductor device.

6. A method for evaluating a local flare in an exposure tool, comprising:
   projecting a first periodic mask pattern formed in an opaque film of an inspection photomask, onto a resist film on a semiconductor substrate;
   projecting a second mask pattern including an opaque portion formed in the opaque film and an opening portion surrounding the opaque portion onto the resist film, so as to overlay the opaque portion onto a region of the resist film where the first mask pattern is projected;
   forming a plurality of resist images corresponding to the periodic pattern;
   measuring a line width distribution of the resist images in a repeating direction of the resist images;

measuring a line width variation in an end portion of the resist images from an average value of the line widths in a center portion of the resist images; and determining a variation distance, wherein the variation distance is calculated as a distance from the end portion of the resist images to a position where the line width distribution intersects a variation tolerance of the line widths.

7. The method of claim 6, wherein the line widths are corrected based on a mask dimension error of the first mask pattern.

8. The method of claim 6, wherein the resist film includes a plurality of exposed fields onto which the first and the second mask patterns are projected.

9. The method of claim 6, wherein the first mask pattern is a line and space pattern with a width ratio of a line to space of about 1:1.

10. The method of claim 6, wherein the resist images are formed by post exposure bake and development.

11. A correction method for a mask pattern, comprising:

measuring a projection light intensity distribution of an exposure tool on a semiconductor substrate by transferring a monitor mask pattern of an inspection photomask onto the semiconductor substrate, the monitor mask pattern being a window pattern surrounded by an opaque film;

calculating a first ratio between an illumination light intensity at the monitor mask pattern and a first projection light intensity on the semiconductor substrate, the first projection light intensity calculated based on the monitor mask pattern;

calculating a distribution function of a local flare, due to a mask pattern coverage of the monitor mask pattern, based on the first ratio and the projection light intensity distribution;

dividing a design mask pattern of a target photomask into a plurality of unit areas;

calculating a second ratio between the illumination light intensity on each of the unit areas and a second projection light intensity on the semiconductor substrate, the second projection light intensity calculated based on the design mask pattern;

calculating a local flare intensity in each of the unit areas based on the second ratio and the distribution function; and calculating a dimensional variation in a transferred resist pattern of the design mask pattern, based on a distribution of the local flare intensity on a surface of the semiconductor substrate.

12. The correction method of claim 11, wherein the distribution function is expressed by a first constant representing a fraction of a local flare component in the first projection light intensity and a second constant representing a spreading distance of the local flare.

13. The correction method of claim 11, wherein the projection light intensity distribution is calculated from a thickness distribution of the resist film in a surrounding area of a transferred monitor resist pattern of the monitor mask pattern.

14. The correction method of claim 11, wherein the monitor mask pattern is a line and space pattern with a width ratio of a line to space of about 1:1.

15. The correction method of claim 11, wherein the first and second projection light intensity is calculated with illumination conditions of the exposure tool used in a manufacturing process of a semiconductor device.

16. A manufacturing method for a semiconductor device, comprising:

measuring a projection light intensity distribution of an exposure tool on a semiconductor substrate by transferring a monitor mask pattern of an inspection photomask onto the semiconductor substrate, the monitor mask pattern being a window pattern surrounded by an opaque film;

calculating a first ratio between an illumination light intensity at the monitor mask pattern and a first projection light intensity on the semiconductor substrate, the first projection light intensity calculated based on the monitor mask pattern;

calculating a distribution function of a local flare, due to a mask pattern coverage of the monitor mask pattern, based on the first ratio and the projection light intensity distribution;

dividing a design mask pattern of a target photomask into a plurality of unit areas;

calculating a second ratio between the illumination light intensity on each of the unit areas and a second projection light intensity on the semiconductor substrate, the second projection light intensity calculated based on the design mask pattern;

calculating a local flare intensity in each of the unit areas, based on the second ratio and the distribution function;

calculating a dimensional variation in a transferred resist pattern of the design mask pattern, based on a distribution of the local flare intensity on a surface of the semiconductor substrate;

fabricating the target photomask using corrected mask pattern provided by correcting the design mask pattern based on the dimensional variation;

loading a semiconductor substrate coated with a resist film to the exposure tool;

projecting the target photomask onto the semiconductor substrate, so as to transfer the corrected mask pattern on the resist film, and to form a target resist pattern; and processing the semiconductor substrate using the target resist pattern as a mask.

17. The manufacturing method of claim 16, wherein the distribution function is expressed by a first constant representing a fraction of a local flare component in the first projection light intensity and a second constant representing a spreading distance of the local flare.

18. The manufacturing method of claim 16, wherein the first and second projection light intensity is calculated with illumination conditions of the exposure tool used in a manufacturing process of a semiconductor device.

19. A manufacturing method for a semiconductor device, comprising:

repeating processing for each of a plurality of exposure tools including:

projecting a first periodic mask pattern formed in an opaque film of an inspection photomask, onto a resist film on a semiconductor substrate;

projecting a second mask pattern including an opaque portion formed in the opaque film and an opening portion surrounding the opaque portion, onto the resist film, so as to overlay the opaque portion on a region of the resist film where the first mask pattern is projected;

forming a plurality of resist images corresponding to the periodic pattern;

measuring a line width distribution of the resist images in a repeating direction of the resist images;

measuring a line width variation in an end portion of the resist images from an average value of the line widths in a center portion of the resist images; and determining a variation distance,
 wherein the variation distance is calculated as a distance from the end portion of the resist images to a position where the line width distribution intersects a variation tolerance of the line widths,
classifying the exposure tools based on the line width variation and the variation distance;
selecting a target exposure tool for a photolithography process from among the exposure tools; and
executing the photolithography process using the target exposure tool.

20. A computer program product stored on a computer-readable medium and configured to be executed by a computer, comprising:
 an instruction to acquire a projection light intensity distribution on a semiconductor substrate measured by transferring a monitor mask pattern of an inspection photomask onto the semiconductor substrate, the monitor mask pattern being a window pattern surrounded by an opaque film;
 an instruction to calculate a first ratio between an illumination light intensity at the monitor mask pattern and a first projection light intensity on the semiconductor substrate, the first projection light intensity calculated based on the monitor mask pattern;
 an instruction to calculate a distribution function of a local flare, due to a mask pattern coverage of the monitor mask pattern, based on the first ratio and the projection light intensity distribution;
 an instruction to divide a design mask pattern of a target photomask into a plurality of unit areas;
 an instruction to calculate a second ratio between the illumination light intensity on each of the unit areas and a second projection light intensity on the semiconductor substrate, the second projection light intensity calculated based on the design mask pattern; and
 an instruction to calculate a local flare intensity in each of the unit areas, based on the second ratio and the distribution function.

* * * * *